United States Patent
Sudarsanan et al.

(10) Patent No.: US 12,159,140 B2
(45) Date of Patent: Dec. 3, 2024

(54) INSTRUCTION SET ARCHITECTURE FOR NEURAL NETWORK QUANTIZATION AND PACKING

(71) Applicant: QUALCOMM Incorporated, San Diego, CA (US)

(72) Inventors: Srijesh Sudarsanan, Waltham, MA (US); Deepak Mathew, Acton, MA (US); Marc Hoffman, Mansfield, MA (US); Sundar Rajan Balasubramanian, Groton, MA (US); Mansi Jain, Littleton, MA (US); James Lee, Northborough, MA (US); Gerald Sweeney, Chelmsford, MA (US)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 17/732,361

(22) Filed: Apr. 28, 2022

(65) Prior Publication Data
US 2023/0350678 A1    Nov. 2, 2023

(51) Int. Cl.
G06F 9/30 (2018.01)
G06N 3/04 (2023.01)

(52) U.S. Cl.
CPC ...... *G06F 9/30101* (2013.01); *G06F 9/30025* (2013.01); *G06F 9/30036* (2013.01); *G06N 3/04* (2013.01)

(58) Field of Classification Search
CPC ............. G06F 9/30036; G06F 15/8053; G06F 15/8061; G06F 15/8069; G06F 15/8076;
(Continued)

(56) References Cited

U.S. PATENT DOCUMENTS

| 6,247,116 B1 * | 6/2001 | Abdallah | G06F 9/30036 |
| | | | 712/E9.027 |
| 6,738,522 B1 * | 5/2004 | Hsu | H04N 19/60 |
| | | | 358/426.14 |

(Continued)

FOREIGN PATENT DOCUMENTS

EP    3561738 A1    10/2019

OTHER PUBLICATIONS

Nagel, Markus, et al. "A white paper on neural network quantization." arXiv preprint arXiv:2106.08295; 27 pages; Jun. 15, 2021 ( Year: 2021).*

(Continued)

*Primary Examiner* — Keith E Vicary
(74) *Attorney, Agent, or Firm* — QUALCOMM Incorporated

(57) ABSTRACT

An electronic device receives a single instruction to apply a neural network operation to a set of M-bit elements stored in one or more input vector registers to initiate a sequence of computational operations related to a neural network. In response to the single instruction, the electronic device implements the neural network operation on the set of M-bit elements to generate a set of P-bit elements by obtaining the set of M-bit elements from the one or more input vector registers, quantizing each of the set of M-bit elements from M bits to P bits, and packing the set of P-bit elements into an output vector register. P is smaller than M. In some embodiments, the neural network operation is a quantization operation including at least a multiplication with a quantization factor and an addition with a zero point.

12 Claims, 13 Drawing Sheets

(58) Field of Classification Search
CPC .. G06F 15/8084; G06F 15/8092; G06F 15/80; G06F 15/8007; G06F 9/00–3897; G06F 15/00–825; G06F 9/30025
See application file for complete search history.

(56) References Cited

U.S. PATENT DOCUMENTS

| | | | | |
|---|---|---|---|---|
| 11,269,632 | B1* | 3/2022 | AlBarakat | G06F 9/3861 |
| 2002/0026569 | A1* | 2/2002 | Liao | G06F 9/30043 712/E9.033 |
| 2003/0067977 | A1* | 4/2003 | Chu | H04N 19/126 375/240.03 |
| 2003/0191788 | A1* | 10/2003 | Auyeung | G06F 7/4873 708/650 |
| 2004/0120594 | A1* | 6/2004 | Vitali | H04N 19/94 375/E7.14 |
| 2005/0055389 | A1* | 3/2005 | Ramanujam | G06F 15/82 712/E9.034 |
| 2006/0095713 | A1* | 5/2006 | Boggs | G06F 9/3001 712/E9.02 |
| 2008/0255839 | A1* | 10/2008 | Larri | G10L 15/06 704/238 |
| 2012/0259905 | A1* | 10/2012 | Kan | G06F 7/49942 708/505 |
| 2014/0208080 | A1* | 7/2014 | Ould-Ahmed-Vall | G06F 9/3001 712/226 |
| 2016/0328646 | A1 | 11/2016 | Lin et al. | |
| 2017/0147920 | A1* | 5/2017 | Huo | G06N 3/045 |
| 2018/0300603 | A1* | 10/2018 | Ambardekar | G06F 9/3836 |
| 2018/0307950 | A1* | 10/2018 | Nealis | G06N 3/084 |
| 2018/0307980 | A1* | 10/2018 | Barik | G06F 9/3877 |
| 2018/0315158 | A1* | 11/2018 | Nurvitadhi | G06F 9/30196 |
| 2018/0322382 | A1* | 11/2018 | Mellempudi | G06F 7/5443 |
| 2020/0210839 | A1 | 7/2020 | Lo et al. | |
| 2020/0264876 | A1 | 8/2020 | Lo et al. | |
| 2021/0004663 | A1* | 1/2021 | Park | G06N 3/047 |
| 2021/0110508 | A1 | 4/2021 | Mellempudi et al. | |
| 2021/0133278 | A1* | 5/2021 | Fang | G06N 3/02 |
| 2021/0149635 | A1 | 5/2021 | Rhisheekesan et al. | |
| 2021/0157549 | A1* | 5/2021 | Elmer | G06N 3/045 |
| 2021/0208885 | A1* | 7/2021 | Song | G11C 7/1006 |
| 2021/0224033 | A1* | 7/2021 | Li | G06F 7/5443 |
| 2021/0279568 | A1* | 9/2021 | Yoo | G06N 3/04 |
| 2021/0350230 | A1* | 11/2021 | Zheng | G06F 12/0875 |
| 2021/0397925 | A1 | 12/2021 | Ma et al. | |
| 2022/0044114 | A1 | 2/2022 | Sriram et al. | |
| 2022/0067512 | A1 | 3/2022 | Khailany et al. | |
| 2022/0067530 | A1 | 3/2022 | Khailany et al. | |
| 2022/0206743 | A1* | 6/2022 | Heinecke | G06F 9/30036 |

OTHER PUBLICATIONS

Jacob, B. et al., "Quantization and Training of Neural Networks for Efficient Integer-Arithmetic-Only Inference," 2018 IEEE/CVF Conference on Computer Vision and Pattern Recognition, Jun. 18-23, 2018, Salt Lake City, UT, USA, IEEE, 10 pages.

Krishnamoorthi, R., "Quantizing deep convolutional networks for efficient inference: A whitepaper," arXiv:1806.08342v1 [cs.LG], Jun. 21, 2018, 36 pages.

International Search Report and Written Opinion for International Patent Application No. PCT/US2023/015662, mailed Jun. 14, 2023, 16 pages.

* cited by examiner

INSTRUCTION SET ARCHITECTURE FOR NEURAL NETWORK QUANTIZATION AND PACKING

TECHNICAL FIELD

This application relates generally to data processing including, but not limited to, methods, systems, and devices for using a single instruction to initiate a sequence of computational operations corresponding to a neural network function or operation.

BACKGROUND

Neural networks (NNs) have been widely applied in deep learning techniques to mimic operations of a human brain and address complex data-driven issues in a variety of applications. Examples of these applications include, but are not limited to, facial recognition, stock market prediction, handwriting recognition, image processing, and speech synthesis. Each neural network includes one or more layers of artificial neurons configured to convert input data to output data. For each neural network layer, the artificial neurons combine incoming data in a weighted and linear manner and apply non-linear activation functions on the combined data to generate intermediate data to be processed by a next layer of the neural network of the output data of the neural network. These neural network operations involve computational operations that can be implemented on existing generic processors, e.g., central processing units (CPUs). However, the generic processors normally repeat similar or identical computational operations on data associated with individual artificial neurons without taking into account any neural network architecture, thereby requiring a large amount of computational, storage, and power resources. This makes deployment of a relatively complex neural network nearly implausible on mobile devices having limited resources. It would be highly desirable to provide an efficient hardware and/or software mechanism that implements computational operations associated with neural network functions in an electronic device (particularly, in a mobile device).

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of some implementations are used to use a single instruction to initiate a sequence of computational operations corresponding to a neural network function or operation (e.g., neuron-level activation and quantization). After the single instruction is issued, the sequence of operations are automatically implemented in a predefined order to process multiple feature vector elements of a neural network layer in parallel using processor and register resources that are arranged based on the single instruction. Such single instruction initiated arrangement helps conserve computational, storage, and power resources that are utilized during a neural network inference process implemented on a resource-constrained platform (e.g., a wearable device, a smart home appliance, a modem device, an Internet of Things (IoT) device, and a mobile phone).

In one aspect of this application, a method is employed at an electronic device (e.g., a mobile device) for quantizing neural network data. The electronic device has one or more processors and memory storing one or more programs. The one or more processors include a plurality of vector registers. The method includes receiving a single instruction to apply a neural network operation to a set of M-bit elements stored in one or more input vector registers and, in response to the single instruction, implementing the neural network operation on the set of M-bit elements to generate a set of P-bit elements. P is smaller than M. Implementing the neural network operation further includes obtaining the set of M-bit elements from the one or more input vector registers, quantizing each of the set of M-bit elements from M bits to P bits of a respective element of the set of P-bit elements, and packing the set of P-bit elements into an output vector register.

In some implementations, the single instruction includes a quantization factor and a zero point, and the neural network operation is a quantization operation including at least a multiplication with the quantization factor and an addition with the zero point. The addition follows the multiplication.

In some implementations, quantizing each of the set of M-bit elements further includes using single instruction, multiple data (SIMD) to quantize the set of M-bit elements from M bits to P bits of the respective element of the set of P-bit elements in parallel In some implementations, the set of M-bit elements includes a first set of M-bit elements, and the set of P-bit elements includes a first set of P-bit elements. The method further includes based on a size of the one or more input vector registers, segmenting an input feature vector to a plurality of sets of M-bit elements including the first set of M-bit elements and one or more remaining sets of M-bit elements. The method further includes loading each set of M-bit elements from the memory of the electronic device to respective input vector registers or storing each set of M-bit elements to the respective input vector registers in response to one or more preceding instructions. The method further includes repeating the single instruction to implement the neural network operation on each of the one or more remaining sets of M-bit elements to generate a respective remaining set of P-bit elements.

In another aspect of this application, a method is employed at an electronic device (e.g., a mobile device) for applying an activation function on neural network data. The electronic device has one or more processors and memory storing one or more programs. The one or more processors include one or more input vector registers. The method includes receiving a single instruction to apply a linear activation operation to a set of first elements stored in one or more input vector registers, and the single instruction includes one or more scalars and a bias value. The method further includes, in response to the single instruction, implementing the linear activation operation on the set of first elements to generate a set of output elements. Implementing the linear activation operation further includes, for each element of the set of first elements, detecting a sign value of the respective element of the set of first elements, selecting a respective scalar from the one or more scalars based on the sign value, and applying the linear activation operation on the respective element of the set of first elements based on the selected respective scalar and the bias value to generate a respective element of the set of output elements. The method further includes quantizing the set of output elements.

In some implementations, the set of first elements includes a first set of first elements. The method further includes, based on a size of the one or more input vector registers, segmenting a first feature vector to a plurality of sets of first elements including the first set of first elements and one or more remaining sets of first elements, loading each set of first elements from the memory of the electronic device to respective input vector registers or storing each set of first elements to the respective input vector registers in response to one or more preceding instructions, and repeating the single instruction to implement the linear activation operation on each of the one or more remaining sets of first elements. Further, in some implementations, the electronic device further includes an output vector register, and the set of output elements include a first set of output elements, implementing the linear activation operation further comprises packing the first set of output elements in the output vector register.

In yet another aspect, an electronic device includes one or more processors and memory storing one or more programs. The one or more processors include at least one or more input vector registers. The electronic device is configured to implement any of the above methods.

In yet another aspect, a non-transitory computer readable storage medium stores one or more programs and at least one or more input vector registers. The one or more programs include instructions that when executed by one or more processors, cause the one or more processors to perform any of the above methods.

In yet another aspect, an apparatus includes means for performing any of the above methods.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Figure 1:
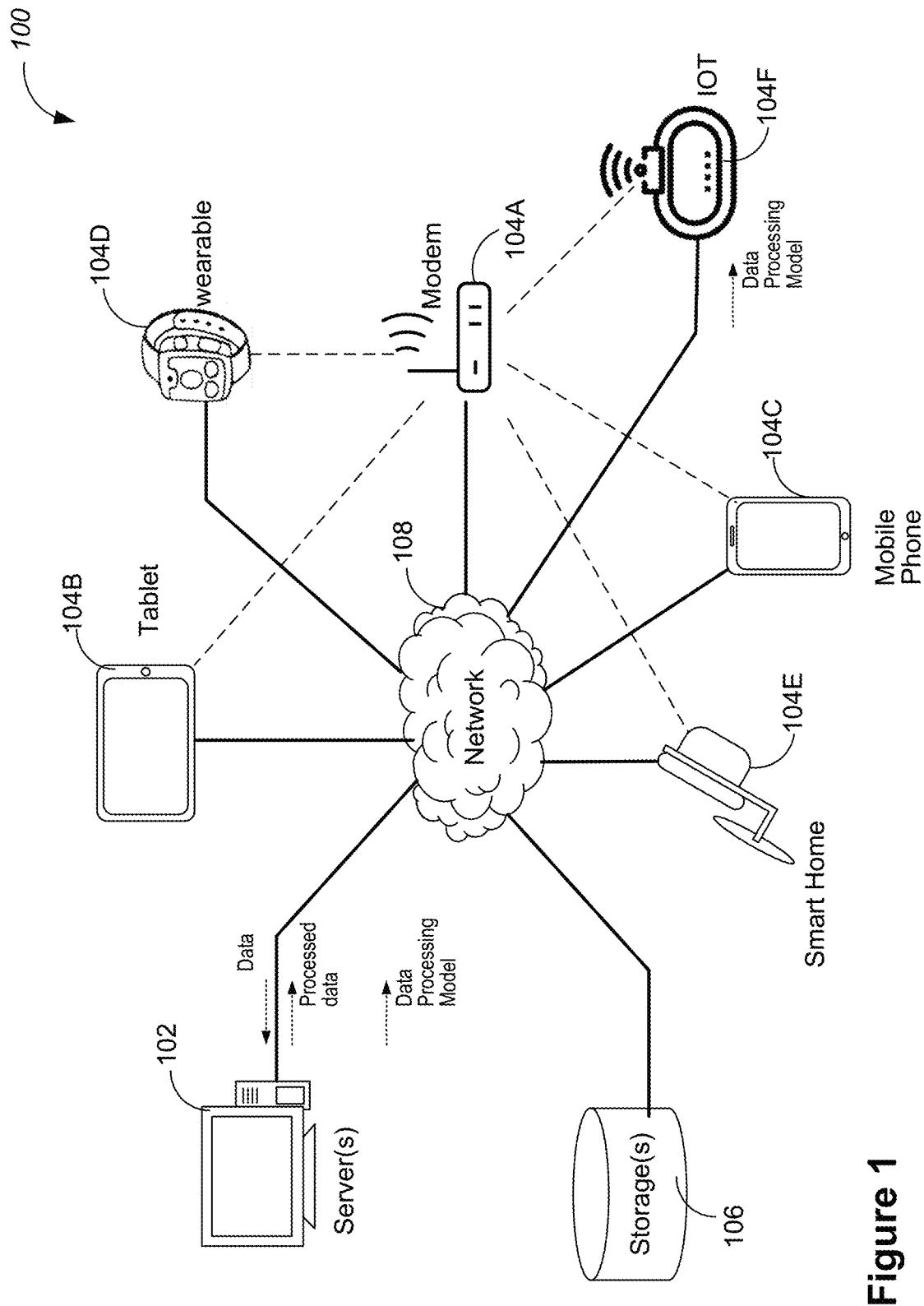
FIG. 1 is an example data processing environment having one or more servers communicatively coupled to a plurality of electronic devices, in accordance with some implementations.

For a better understanding of the various described implementations, reference should be made to the Detailed Description below, in conjunction with the following drawings in which like reference numerals refer to corresponding parts throughout the figures. Like reference numerals refer to corresponding parts throughout the drawings.

DESCRIPTION OF IMPLEMENTATIONS

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details.

FIG. 1 is an example data processing environment 100 having one or more servers 102 communicatively coupled to a plurality of electronic devices 104, in accordance with some implementations. The plurality of electronic devices 104 may include, for example, network interface device 104A, tablet computer 104B, mobile phones 104C, wearable device 104D, or intelligent, multi-sensing, network-connected home devices 104E (e.g., a surveillance camera, a smart television device, a drone), or other Internet-of-Things (IoT) device 104F. Each electronic device 104 can collect data or user inputs, execute user applications, and present outputs on its user interface. The collected data or user inputs can be processed locally at the electronic device 104 and/or remotely by the server(s) 102. The one or more servers 102 provide system data (e.g., boot files, operating system images, and user applications) to the electronic devices 104, and process the data or user inputs received from the electronic device(s) 104. In some implementations, distinct function modules are executed concurrently at a server 102 and an electronic device 104 to enable a user application for a user of the electronic device 104. In some implementations, the data processing environment 100 further includes one or more storages 106 for storing data related to the server(s) 102, electronic devices 104, and user applications executed on the server(s) 102 and electronic devices 104.

The server(s) 102, electronic devices 104, and storage(s) 106 are communicatively coupled to each other and configured to exchange data via one or more communication networks 108, which are the medium used to provide communications links between the devices and computers connected together within the data processing environment 100. The one or more communication networks 108 may include connections, such as wire, wireless communication links, or fiber optic cables. Examples of the one or more communication networks 108 include local area networks (LAN), wide area networks (WAN) such as the Internet, or a combination thereof. The one or more communication networks 108 are, optionally, implemented using any known network protocol, including various wired or wireless protocols, such as Ethernet, Universal Serial Bus (USB), FIRE-WIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Examples of a network interface device 104A include a router, modem, switch, gateway, hub, or an intelligent, dedicated whole-home control node. For each electronic device 104 distinct from the network interface device 104A, a connection to the one or more communication networks 108 may be established either directly (e.g., using 3G/4G/5G connectivity to a wireless carrier), or through the network interface device 104A, or through any combination thereof. For example, an LTE modem provides a multi-mode single chipset connectivity solution built to support reliable, optimized cellular connectivity for IoT devices 104F such as asset trackers, health monitors, security systems, smart city sensors and smart meters, as well as a range of wearable devices 104D. Such an LTE modem helps battery-powered IoT devices 104F operate for an extended duration of time (e.g., nearly 10 years or longer) in the field, and interacts with IoT devices 104F requiring low-power, wide-area connectivity in a small form factor efficiently.

The one or more communication networks 108 can represent the Internet of a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages.

In some embodiments, deep learning techniques are applied in the data processing environment 100 to process data (e.g., visual data, audio data) via a user application executed at an electronic device 104. These deep learning techniques can identify information contained in the data, match the data with other data, categorize the data, or synthesize related data using data processing models that are created based on one or more neural networks to process the data. These data processing models are trained with training data before they are applied to process the data. In some implementation, a server 102 dominates a data processing process, i.e., trains a data processing model, obtains the data provided by the electronic devices via the communication network(s) 108, processes the data using the data processing model, and returns the processed data to the electronic devices. Alternatively, in some implementations, a server 102 and an electronic device 104 collaborate to complete a data processing process. A data processing model is trained at a server 102 and provided to individual electronic devices 104. Each electronic device 104 obtains the data (e.g., captures video data via an internal camera, receives data via the communication network(s) 108) and processes the data using the data processing models locally. Additionally, in some implementations, an electronic device 104 has large amount of computational, storage, and power resources, and completes training of a data processing model and inference of the data independently with no or little involvement by a server 102.

In some implementations of this application, an electronic device 104 (e.g., a network interface device 104A) has limited computational, storage, and power resources. Such an electronic device 104 does not train, and directly utilizes, a data processing model that is created based on one or more neural networks and has been trained by a server 102. Additionally, this data processing model is modified before it is deployed to the electronic device 104. For example, the one or more neural networks are pruned or quantized by the server 102, so that the corresponding data processing model can be simplified in view of the resources of the electronic device 104. When the modified data processing model is executed at the electronic device 104, the electronic device 104 applies a predefined single instruction to implement a corresponding neural network operation (e.g., quantization, application of an activation function) associated with the one or more neural networks. The predefined single instruction initiates a sequence of predefined computational operations within a vector processor of the electronic device to implement the corresponding neural network operation. By these means, the electronic device 104 reserves its own computational, storage, and power resources during neural network inference.

Figure 2A:
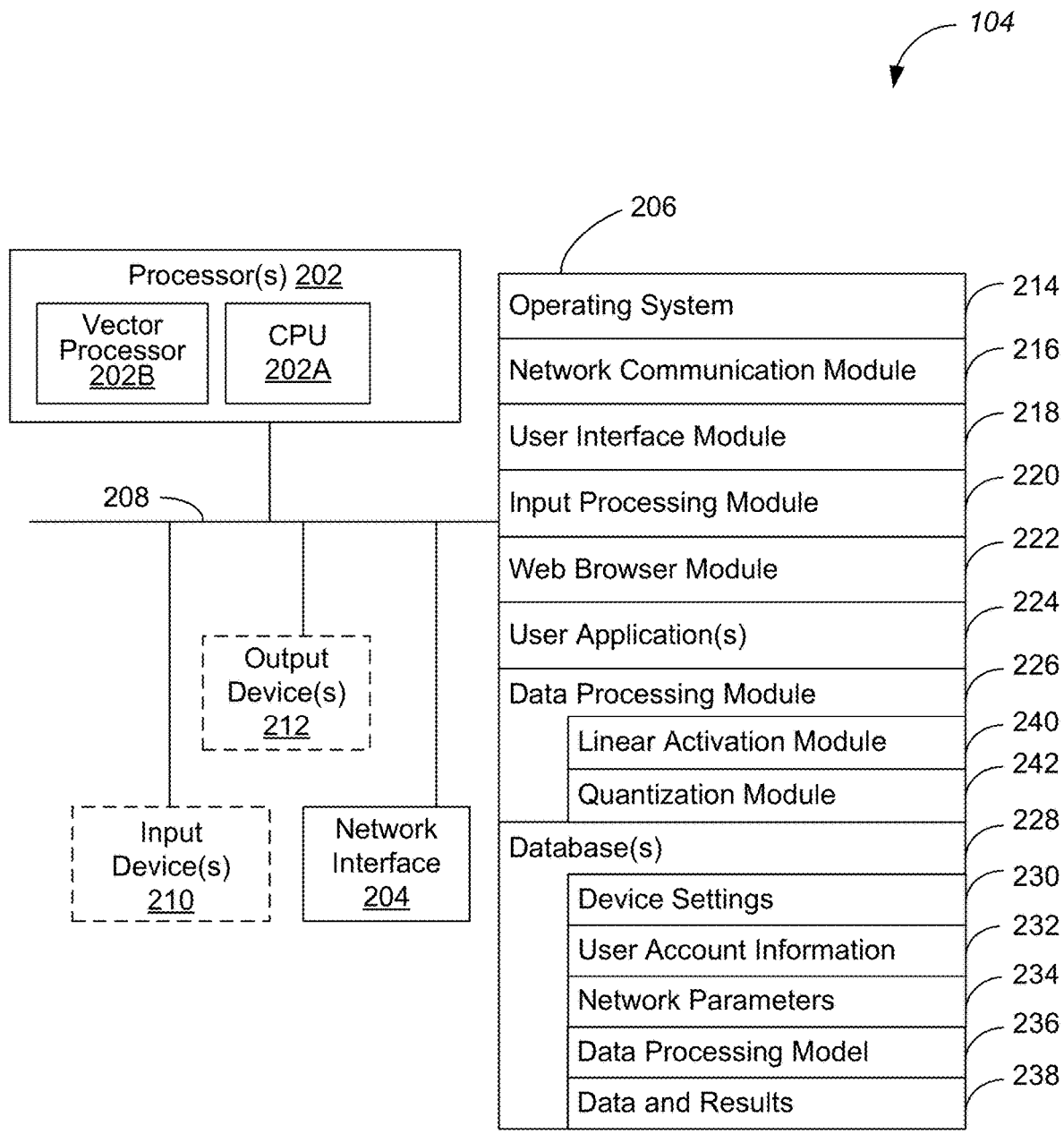
FIG. 2A is a block diagram illustrating an electronic device configured to process data using neural networks, in accordance with some implementations.

FIG. 2A is a block diagram illustrating an electronic device 104 configured to process data using neural networks, in accordance with some implementations. The electronic device 104 includes one or more processors 202 (e.g., CPUs 202A, vector processor 202B), one or more network interfaces 204, memory 206, and one or more communication buses 208 for interconnecting these components (sometimes called a chipset or a system-on-a-chip (SoC)). The vector processor 202B is distinct from and external to the CPUs 202A. In some implementations, the electronic device 104 includes one or more input devices 210 that facilitate user input, such as a keyboard, a mouse, a voice-command input unit or microphone, a touch screen display, a touch-sensitive input pad, a gesture capturing camera, or other input buttons or controls. Further, in an example, the electronic device 104 uses a microphone for voice recognition or a camera for gesture recognition to supplement or replace the keyboard. In some embodiments, the electronic device 104 includes one or more optical cameras (e.g., an RGB camera), scanners, or photo sensor units for capturing images, for example, of graphic serial codes printed on the electronic devices. In some implementations, the electronic device 104 also includes one or more output devices 212 that enable presentation of user interfaces and display content, including one or more speakers and/or one or more visual displays. Optionally, the electronic device 104 includes a location detection device, such as a GPS (global positioning system) or other geo-location receiver, for determining the location of the electronic device 104.

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processors 202. Memory 206, or alternatively the non-volatile memory within memory 206, includes a non-transitory computer readable storage medium. In some embodiments, memory 206, or the non-transitory computer readable storage medium of memory 206, stores the following programs, modules, and data structures, or a subset or superset thereof:

- Operating system 214 including procedures for handling various basic system services and for performing hardware dependent tasks;
- Network communication module 216 for connecting each electronic device 104 to other devices (e.g., server 102, electronic device 104, or storage 106) via one or more network interfaces 204 (wired or wireless) and one or more communication networks 108, such as the Internet, other wide area networks, local area networks, metropolitan area networks, and so on;
- User interface module 218 for enabling presentation of information (e.g., a graphical user interface for application(s) 224, widgets, websites and web pages thereof, and/or games, audio and/or video content, text, etc.) at each electronic device 104 via one or more output devices 212 (e.g., displays, speakers, etc.);
- Input processing module 220 for detecting one or more user inputs or interactions from one of the one or more input devices 210 and interpreting the detected input or interaction;
- Web browser module 222 for navigating, requesting (e.g., via HTTP), and displaying websites and web pages thereof, including a web interface for logging into a user account associated with an electronic device 104 or another electronic device, controlling the electronic device 104 if associated with the user account, and editing and reviewing settings and data that are associated with the user account;
- One or more user applications 224 for execution by the electronic device 104 (e.g., games, social network applications, smart home applications, and/or other web or non-web based applications for controlling another electronic device 104 and reviewing data captured by such devices);
- Data processing module 226 for processing data using data processing models 236, thereby identifying information contained in the data, matching the data with other data, categorizing the data, or synthesizing related content data, where in some embodiments, the data processing module 226 is associated with one of the user applications 224 to process the data in response to a single instruction received from the user application 224; and
- One or more databases 228 for storing at least data including one or more of:
  - Device settings 230 including common device settings (e.g., service tier, device model, storage capacity, processing capabilities, communication capabilities, etc.) of the electronic devices 104;
  - User account information 232 for the one or more user applications 224, e.g., user names, security questions, account history data, user preferences, and predefined account settings;
  - Network parameters 234 for the one or more communication networks 108, e.g., IP address, subnet mask, default gateway, DNS server and host name;
  - Data processing model(s) 236 for processing data (e.g., video, image, audio, or text) using neural networks; and
  - Data and results 238 that are obtained by and outputted to the electronic device 104, respectively, where the data is processed by the data processing model(s) 236 locally at the electronic device 104 to provide the associated results to be presented on electronic device 104.

In some implementations, the data processing module 226 includes a linear activation module 240 configured to be implemented by the vector processor 202B. The linear activation module 240 is configured to, in response to a single instruction, apply a linear activation function on a set of feature vector elements associated with a layer of a neural network in parallel. This linear activation function is implemented on each feature vector element via a sequence of computational operations (e.g., multiplication, addition). The single instruction initiates implementation of the sequence of computational operations corresponding to the linear activation function.

In some implementations, the data processing module 226 includes a quantization module 242 configured to be implemented by the vector processor 202B. The quantization module 242 is configured to, in response to a single instruction, quantize a set of feature vector elements associated with a layer of a neural network in parallel. This quantization function is implemented on each feature vector element via a sequence of computational operations (e.g., multiplication, addition). The single instruction initiates implementation of the sequence of computational operations corresponding to the quantization function.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, memory 206, optionally, stores a subset of the modules and data structures identified above. Furthermore, memory 206, optionally, stores additional modules and data structures not described above.

Figure 2B:
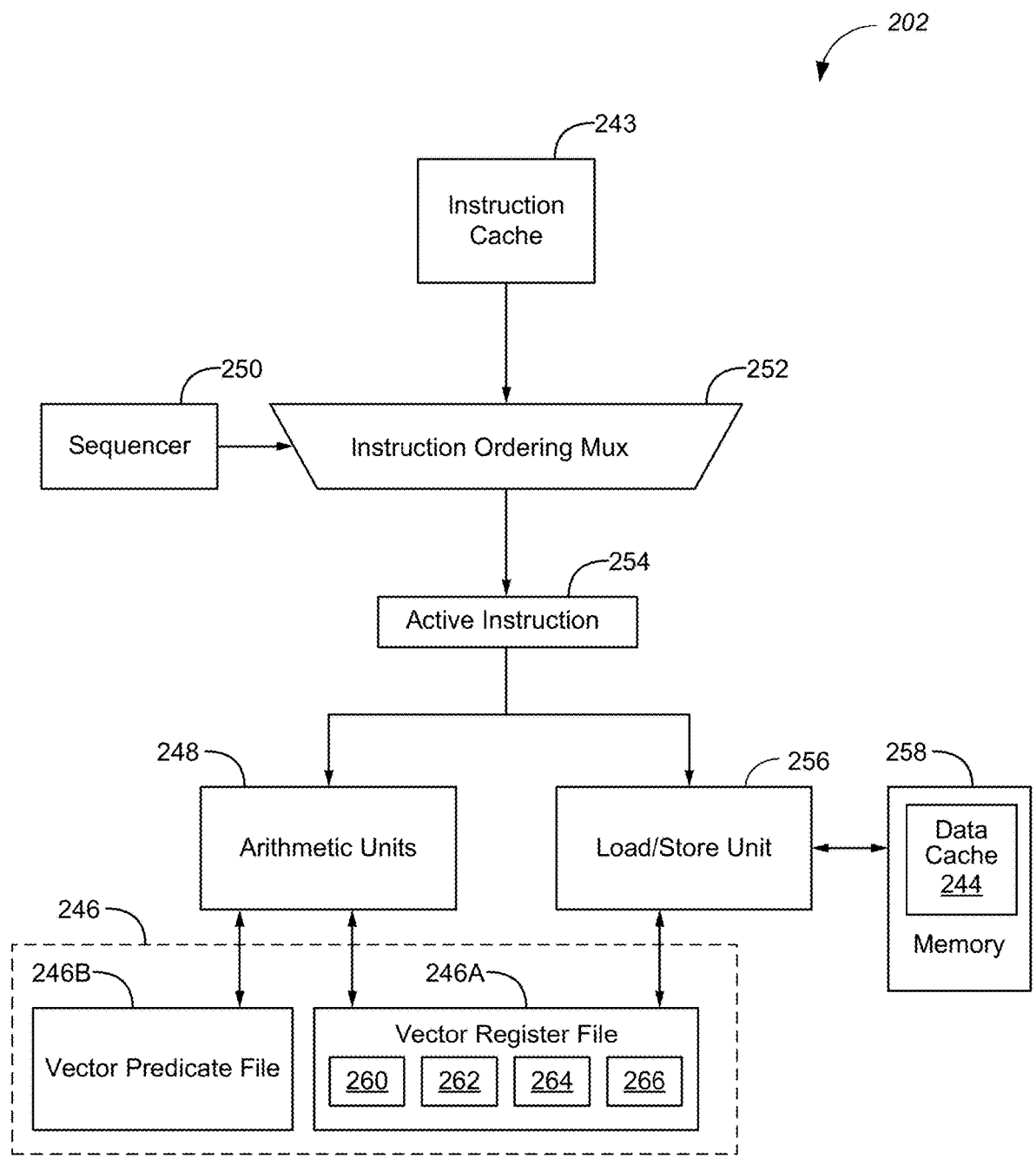
FIG. 2B is a block diagram of a processor of an example electronic device 104, in accordance with some implementations.

FIG. 2B is a block diagram of a processor 202 of an example electronic device 104, in accordance with some implementations. The processor 202 includes an instruction cache 243, a data cache 244, registers 246, and arithmetic units 248. These generic components of the processor 202 are configured to implement neural network operations stored in the instruction cache 243. Specifically, the instruction cache 243 is first-in, first-out (FIFO) memory, and a plurality of instructions are stored in the instruction cache 243. Retrieval of the plurality of instructions follow the same order and sequence as storage of the plurality of instructions. The processor 202 further includes a sequencer 250 and an instruction ordering multiplexer 252. The sequencer 250 is configured to control the instruction ordering multiplexer 252 to select each individual instruction arranged in the instruction cache 243, and an active instruction 254 is currently selected and implemented by the processor 202.

The processor 202 further includes a load/store unit 256 configured to execute load/store instructions related to the active instruction 254, generate virtual addresses of the load and store operations, and load data from memory 258 or store it back to memory 258 from the registers 246 in response to the active instruction 254. The memory 258 includes data caches 244 (e.g., an L1 cache) of the processor 202. In some implementations, the memory 258 further includes higher levels of caches (e.g., L2 and L3 caches) and dynamic random-access memory (DRAM) that is external to the processor 202. In some situations, the load/store unit 256 extracts the data to be used in implementation of the active instruction 254 directly from the data cache 244. Conversely, in some situations, the data to be used does not exist in the data cache 244, the load/store unit 256 accesses the higher levels of caches or DRAM to extract the data to be used in implementation of the active instruction 254. The result of implementation of the active instruction 254 is optionally stored in the registers 246 and directly used by a subsequent instruction. Alternatively, the load/store unit 256 stores the result in the registers 246 and moves it further into the memory 258, e.g., the data caches 244.

In accordance with the active instruction 254, the processor 202 is configured to allocate a plurality of registers 246 and arithmetic units 248, which are organized to complete the active instruction 254 end-to-end without being interrupted by additional communication with the instruction cache 243. The registers 246 optionally include a vector register file 246A and a vector predicate file 246B. The vector register file 246A corresponds to one or more input vector registers 260, an output vector register 262, one or more scalar registers 264, and intermediate result registers 266. Data in the intermediate result registers 266 are purged after the single instructions are completed. The vector predicate file 246B stores predicates associated with each computational operation used to implement the active instruction 254.

In some implementations, the processor 202 is a vector processor 202B, and the vector processor 202B is part of a larger heterogenous modem computer system 104A (e.g., an LTE modem). Input data or output data of a layer of a neural network correspond to a feature vector including a plurality of elements. The active instruction 254 includes an activation instruction or a quantization instruction on the feature vector of the layer of the neural network. In some situations, the plurality of elements are processed by the vector processor 202B in parallel in response to the active instruction 254. Alternatively, in some situations, the plurality of elements are grouped to a plurality of subsets of elements. Each subset of elements are processed by the vector processor 202B in parallel in response to the active instruction 254, and the active instruction 254 is repeated until all of the subsets of elements are processed. As to each individual active instruction 254, a sequence of basic computational operations are implemented to process data loaded in the input vector register(s) 260 in parallel, without being interrupted by loading instructions or data from the memory 258.

Figure 3A:
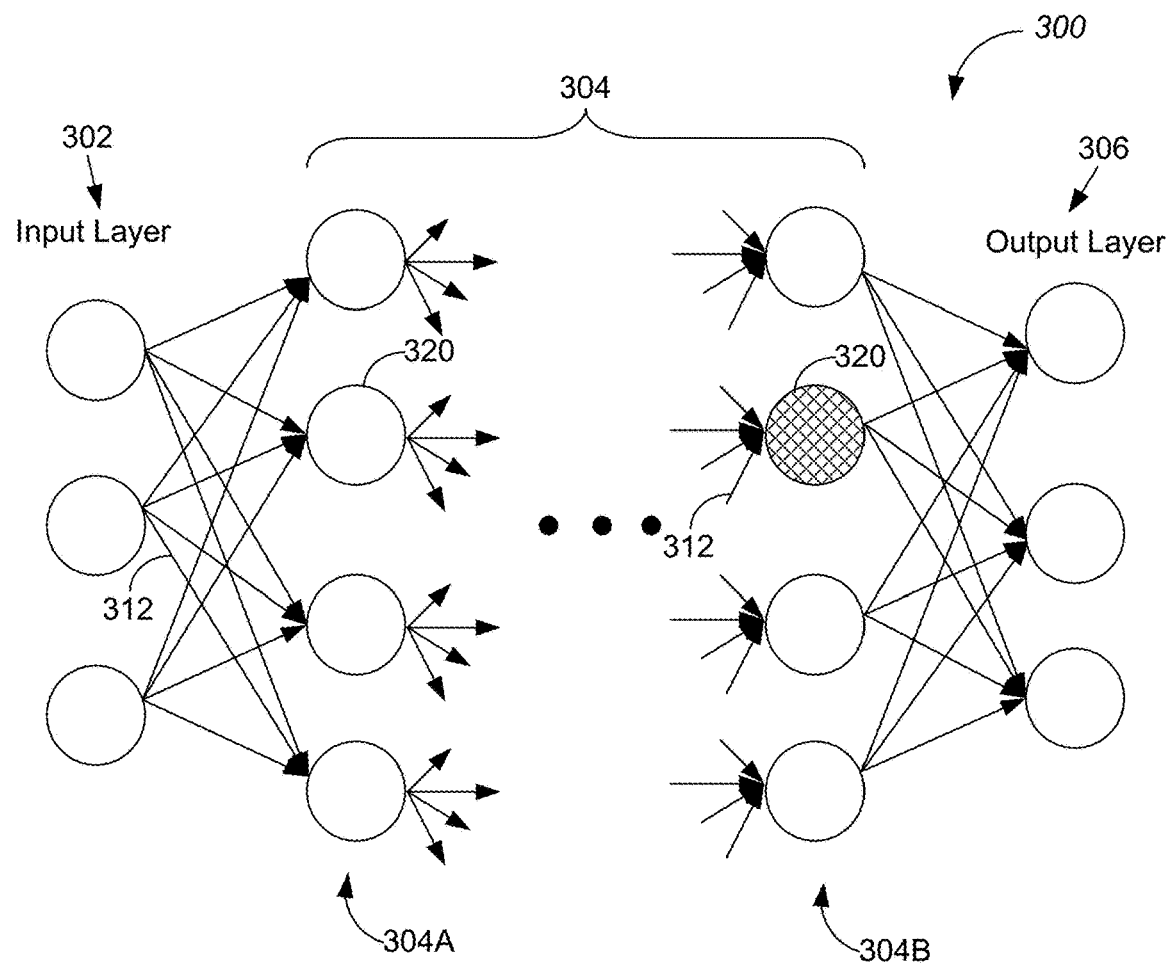
FIG. 3A is an example neural network (NN) applied to process data, in accordance with some implementations.
Figure 3B:
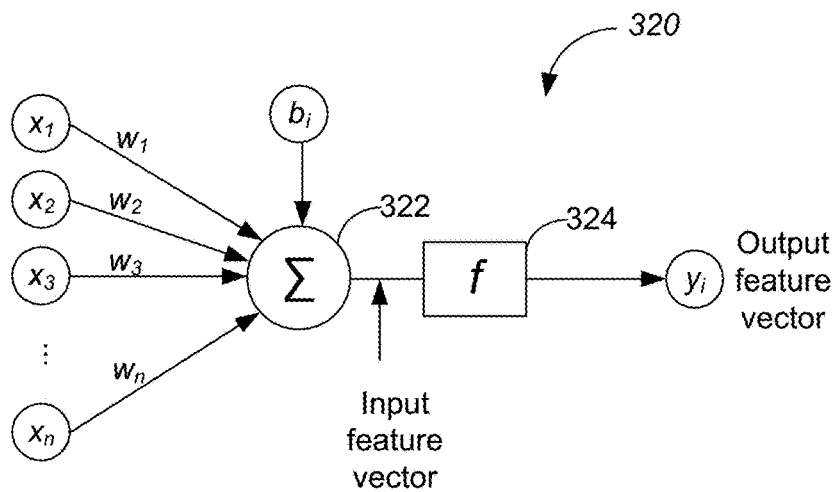
FIG. 3B is an example artificial neuron in the neural network, in accordance with some implementations.

FIG. 3A is an example neural network (NN) 300 applied to process data, in accordance with some implementations, and FIG. 3B is an example artificial neuron 320 (also called node or filter) in the neural network 300, in accordance with some implementations. The neural network 300 includes a collection of artificial neuron 320 that are connected by links 312. Each artificial neuron 320 receives one or more node inputs $x_1, x_2, x_3, \ldots$ and $x_n$ and applies a propagation function to generate a node output $y_i$ from the one or more node inputs $x_1, x_2, x_3, \ldots$ and $x_n$. The one or more node inputs $x_1, x_2, x_3, \ldots$ and $x_n$ are combined based on corresponding weights $w_1, w_2, w_3, \ldots$ and $w_n$ according to the propagation function. Likewise, as the node output $y_i$ is provided via one or more links 312 to one or more other artificial neurons 320, a weight w associated with each link 312 is applied to the node output $y_i$. In an example, the propagation function of the artificial neuron 320 includes an activation function 324 applied on a linear weighted combination 322 of the one or more node inputs $x_1, x_2, x_3, \ldots$ and $x_n$. In some situations, the linear weighted combination 322 of the one or more node inputs $x_1, x_2, x_3, \ldots$ and $x_n$ includes a node bias $b_i$. The activation function 324 is optionally linear or non-linear.

The collection of artificial neurons 320 is organized into one or more layers in the neural network 300. Optionally, the one or more layers includes a single layer acting as both an input layer 302 and an output layer 306. Optionally, the one or more layers includes an input layer 302 for receiving inputs, an output layer 306 for providing outputs, and zero or more hidden layers 304 (e.g., 304A and 304B) between the input and output layers 302 and 306. A deep neural network has more than one hidden layers 304 between the input and output layers 302 and 306. In the neural network 300, each layer is only connected with its immediately preceding and/or immediately following layer. In some embodiments, a neural network layer (e.g., the input layer 302, the hidden layer 304B) is a fully connected layer because each artificial neuron 320 in the layer is connected to every artificial neuron 320 in its immediately following layer.

Figure 4A:
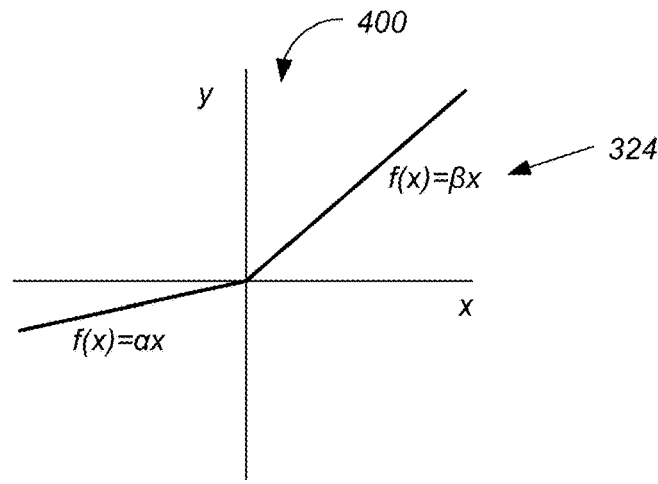
FIGS. 4A and 4B illustrate example linear activation functions configured to be implemented by linear activation operations at artificial neurons of a neural network, in accordance with some implementations.
Figure 4B:
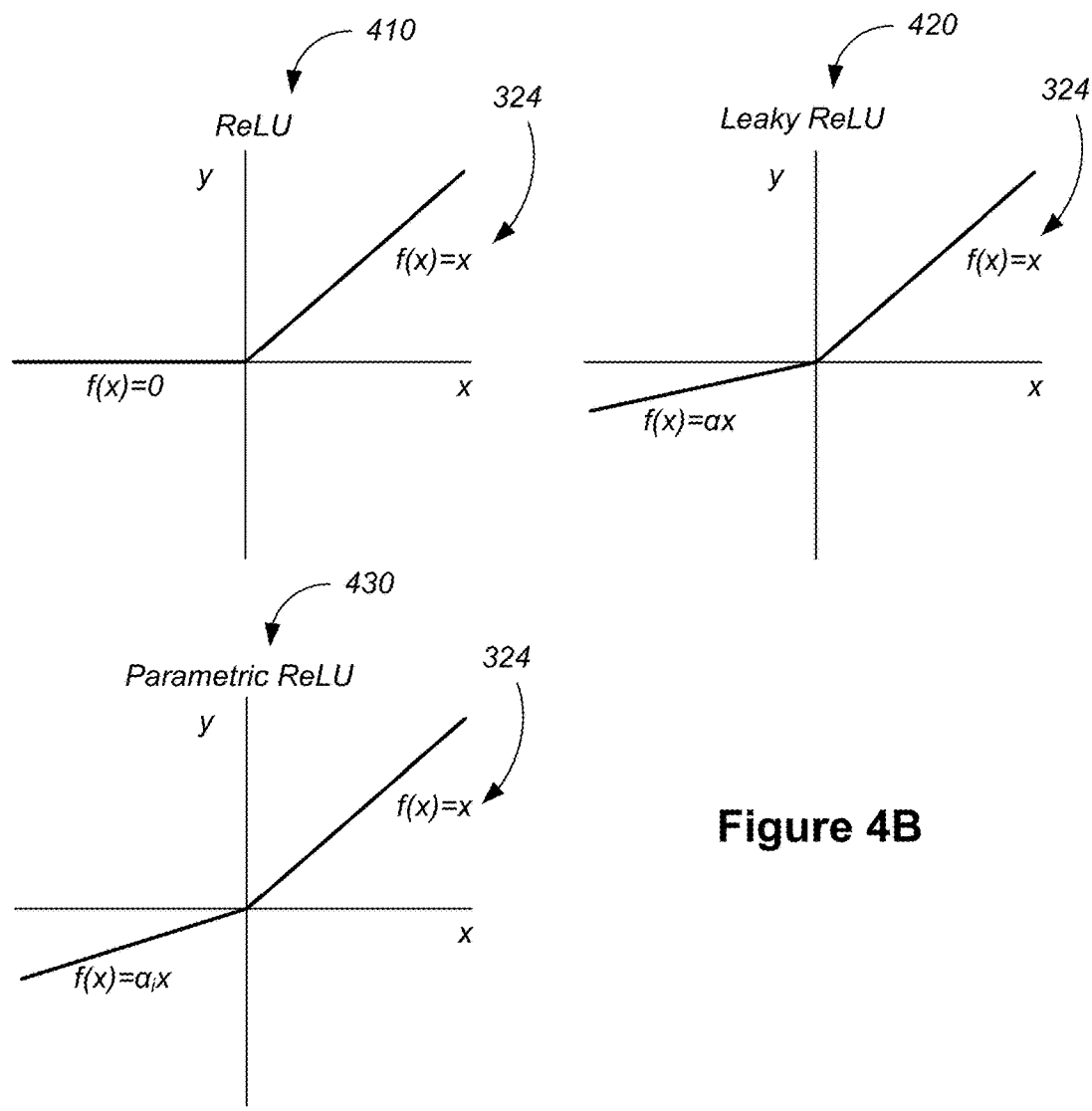

FIGS. 4A and 4B illustrate example linear activation functions 324 configured to be implemented by linear activation operations at artificial neurons 320 of a neural network 300, in accordance with some implementations. In a neural network 300, each artificial neuron 320 has a respective activation function 324 that defines a node output y of the respective neuron 320 given a weighted combination 322 of node inputs $x_1, x_2, \ldots$ and $x_n$. If the artificial neuron 320 is part of an input layer 302, the one or more node input $x_1, x_2, \ldots$ and $x_n$ correspond to elements of an input feature vector. If the artificial neuron 320 is part of an output layer 306 or hidden layer 304, the one or more node input $x_1, x_2, \ldots$ and $x_n$ correspond to node outputs y of artificial neurons 320 of one or more other layers in the neural network 300. In an example, a neural network layer (e.g., the output layer 306 and hidden layer 304A in FIG. 3B) follows a fully connected layer, and each artificial neuron 320 in the layer is connected to every artificial neuron 320 in its immediately preceding layer. Node outputs $y_i$ of artificial neurons 320 of a neural network layer collectively form an output feature vector, and is determined as follows:

$$Y = f(W \cdot X + b) \qquad (1)$$

where $f$ is an activation function, $W \in R^{\wedge}(m \times n)$ is a weight matrix, $X \in R^{\wedge}(n \times 1)$ is an input feature vector formed by corresponding node inputs $x_1, x_2, \ldots$ and $x_n$, $b \in R^{\wedge}(m \times 1)$ is a bias vector, and $Y \in R^{\wedge}(m \times 1)$ is an output feature vector of this neural network layer. If this neural network layer follows a fully connected layer, then no element of the weight matrix is equal to 0.

The linear activation function 324 is implemented on the weighted combination 322 of node inputs $x_1, x_2, \ldots$ and $x_n$ of each artificial node 320 of a layer of the neural network 300 in a linear activation unit 400. The linear activation function 324 includes one or more scalars, e.g., a first scalar $\alpha$ and a second scalar $\beta$. The linear activation unit 400 is represented as follows:

$$f(x) = \begin{cases} \alpha \cdot x & x \geq 0 \\ \beta \cdot x & \text{otherwise} \end{cases} \qquad (2)$$

where x is the weighted combination 322 of node inputs $x_1$, $x_2$, . . . and $x_n$ of a corresponding artificial neuron 320. Referring to FIG. 4A, for each artificial node 320 of the neural network layer, if the weighted combination 322 of node inputs is equal to or greater than 0, the weighted combination 322 of node inputs is multiplied with the first scalar α to generate a respective node output $y_i$. Alternatively, for each artificial node 320, if the weighted combination 322 of node inputs is less than 0, the weighted combination 322 of node inputs is multiplied with the second scalar β to generate a respective node output $y_i$.

Referring to FIG. 4B, in some implementations, the linear activation unit includes a rectified linear unit (ReLU) 410, and the first scalar α and second scalar β of the linear activation function 324 of the neural network layer are equal to 1 and 0, respectively. For each artificial node 320 of the neural network layer, if the weighted combination 322 of node inputs is equal to or greater than 0, a respective node output $y_i$ is equal to the weighted combination 322 of node inputs, and if the weighted combination 322 of node inputs is less than 0, the respective node output $y_i$ is equal to 0. Alternatively, in some implementations, the linear activation unit includes a leaky ReLU 420, and the first scalar α of the linear activation function 324 of the neural network layer is equal to 1, while the second scalar β is smaller than 1 (e.g., equal to 0.1). For each artificial node 320 of the neural network layer, if the weighted combination 322 of node inputs is equal to or greater than 0, a respective node output $y_i$ is equal to the weighted combination 322 of node inputs, and if the weighted combination 322 of node inputs is less than 0, the respective node output $y_i$ is equal to the weighted combination 322 of node inputs multiplied with the second scalar β, which is smaller than 1.

Alternatively, in some implementations, the linear activation unit includes a parametric ReLU 430, and the first scalar α of the linear activation function 324 of the neural network layer is equal to 1, while the second scalar β is distinct for each artificial neuron 320, e.g., represented by $β_i$. For each artificial node 320 of the neural network layer, if the weighted combination 322 of node inputs is equal to or greater than 0, a respective node output $y_i$ is equal to the weighted combination 322 of node inputs, and if the weighted combination 322 of node inputs is less than 0, the respective node output $y_i$ is equal to the weighted combination 322 of node inputs multiplied with the second scalar $β_i$. The second scalars $β_i$ of each neural network layer form a scalar vector, which is trained with weights W and biases b of the neural network 300.

Figure 5:
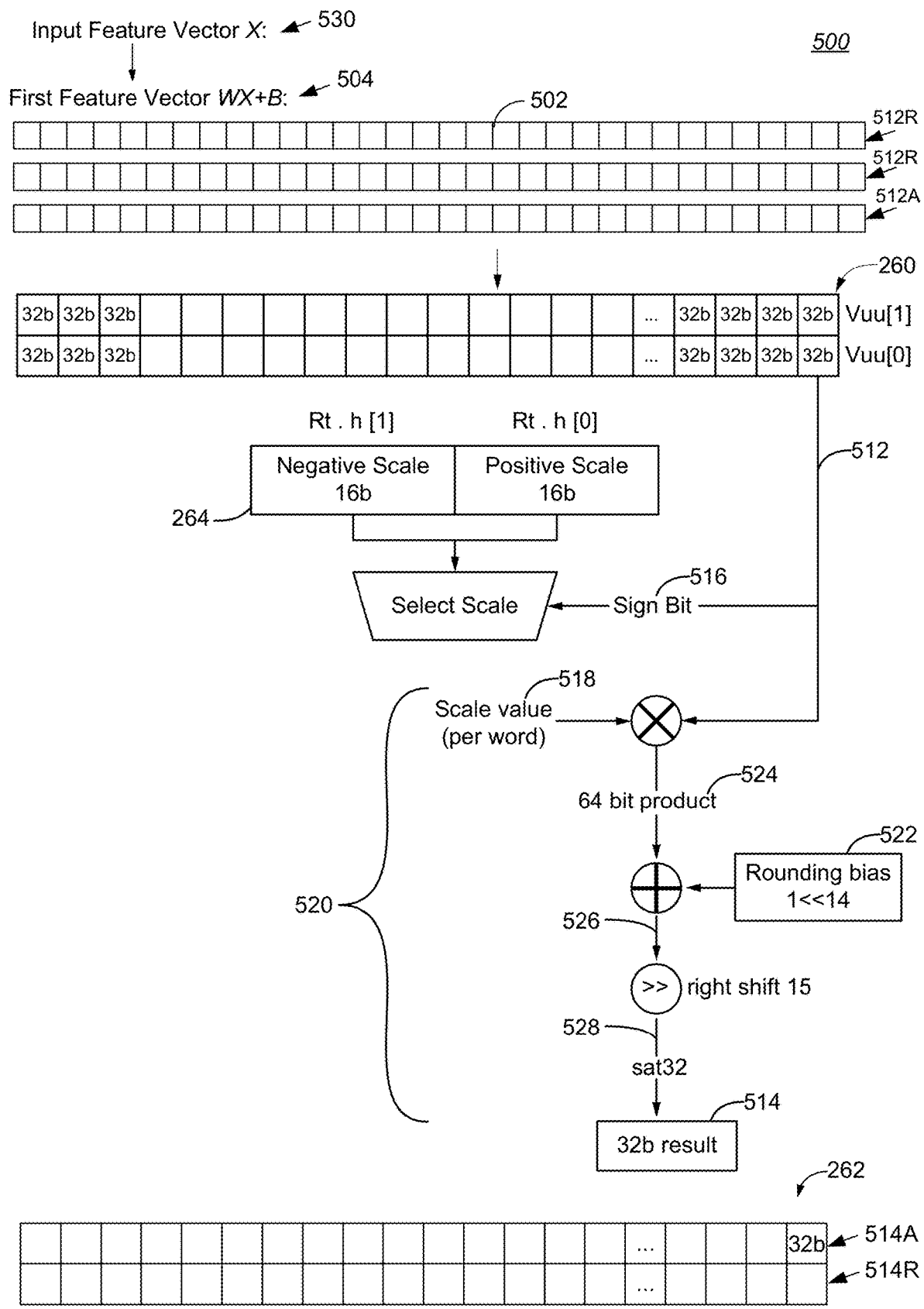
FIG. 5 is a flow diagram of a process of implementing a linear activation operation in response to a single instruction in a vector processor, in accordance with some implementations.

FIG. 5 is a flow diagram of a process 500 of implementing a linear activation operation in response to a single instruction in a vector processor 202B, in accordance with some implementations. As explained above, each artificial node 320 of a neural network layer corresponds to a weighted combination 502 of node inputs. For the entire neural network layer, a plurality of weighted combinations 502 of node inputs of corresponding artificial nodes 320 form a first feature vector 504 to be provided to a linear activation unit 400, 410, 420, or 430. In the linear activation units 400-430, each weighted combination 502 of node inputs requires a scaling operation conditioned on a sign of the respective weighted combination 502. While the weighted combinations 502 of node inputs for artificial neurons 320 of the neural network layer are stored in one or more input vector registers 260, the vector processor 202B extracts each weighted combination 502, determines the sign of weighted combinations 502, selects a scalar using a comparison followed by a multiplexer based on the sign, and multiplies the weighted combination 502 by the selected scalar. Particularly, these computational operations are initiated by a single instruction for activation, and completed as part of the corresponding linear activation operation.

The single instruction corresponds to the one or more input vector registers 260, an output vector register 262, and a scalar register 264. The one or more input vector registers 260 store a set of first elements 512, e.g., a subset of the weighted combinations 502 of node inputs of a neural network layer. The single instruction includes one or more scalars, and the scalar register 264 stores the one or more scalars. In response to the single instruction, the linear activation operation is implemented on the set of first elements 512 stored in and extracted from the one or more input vector registers 260 to generate a set of output elements 514. For each element of the set of first elements 512, the vector processor 202B detects a sign value 516 of the respective element of the set of first elements 512, and selects a respective scalar 518 from the one or more scalars stored in the scalar register 264 based on the sign value 516. The vector processor 202B then applies the linear activation operation 520 on each element of the set of first elements 512 based on the selected respective scalar 518 and a bias value 522 to generate a respective element of the set of output elements 514. The bias value 522 is provided with the single instruction. The vector processor 202B temporarily stores the set of output elements 514 in the output vector register 262. In some implementations, the vector processor 202B extracts the set of output elements 514 from the output vector register 262, and continues to quantize the set of output elements 514 for further processing in a following neural network layer or for outputting to and storage in memory 258.

In some embodiments, the linear activation operation 520 is applied on the respective element of the set of first elements 512 by multiplying the respective element 512 with the respective scalar 518 to generate a scaled respective element 524 and adding the bias value 522 to the scaled respective element 524 to generate a biased respective element 526. For example, a shift of k bits is applied, and the corresponding bias value 522 is 1>>k−1. Further, in some implementations, the respective element of the set of first elements 512 has 32 bits, and the scaled respective element 524 has 64 bits. The shift can be 0-63 bits. In an example, a shift of 15 bits is applied (i.e., k=15), and the corresponding bias value 522 is a constant value of 1<<14 or 0x4000. The vector processor 202B adds the bias value 522 to the biased respective element 524 to obtain a biased respective element 526, and right shifts the biased respective element 526 by 15 bits to a shifted respective element 528, which is further saturated to 32 bits to provide the respective element of the set of output elements 514. Stated another way, the scalar 518 for the linear activation operation 520 is a fixed point number, and the bias value 522 is a rounding value added to the scaled respective element 524 as part of a fixed point arithmetic. In an example, a first element Vuu.V32s[i] (512) is a 32-bit signed number. Each scalar α or β is a 16-bit scalar value stored in a half of a 32-bit scalar register 264. The scaled respective element 524 is equal to α×Vuu.V32s[i] and has 48 bits. The scaled respective element 524 is combined with the rounding bias of the bias value 522, and right shifted by 15 bits. Semantics performing these operations are as follows:

```
fHIDE(int i;) for (i=0;i<64;i++) {
    size2s_t scale_a=Vuu.V32s[i]>0 ? fGETHALF(0,Rt):fGETHALF(1,Rt);
    Vdd.V32s[i]=fVSATW( (((size8s_t)Vuu.V32s[i]*scale_a)+0x4000)>>15)
}
``` where Vuu.V32s[i]*scale_a is the scaled respective element 524 having 48 bits. The scaled respective element 524 is maintained in a 64 bit container.

Stated another way, the one or more scalars include a first scalar α and a second scalar β, which are stored in two portions of the scalar register 264, e.g., Rt.h[1] and Rt.h[0]. For each first element 512, the respective scalar is selected based on the sign value 516. In accordance with a determination that the sign value 516 corresponds to a positive sign, the vector processor 202B selects the first scalar α. In accordance with a determination that the sign value 516 corresponds to a negative sign, the vector processor 202B selects the second scalar β. More specifically, in some implementations, the one or more scalars include 1 and 0 for a ReLU 410. In accordance with a determination that the sign value 516 corresponds to a positive sign, the vector processor 202B selects the respective scalar of 1, and in accordance with a determination that the sign value 516 corresponds to a negative sign, the vector processor 202B selects the respective scalar of 0. In some implementations, the one or more scalars include 1 and a predefined leak parameter β for a leaky ReLU 420. In accordance with a determination that the sign value 516 corresponds to a positive sign, the vector processor 202B selects the respective scalar of 1, and in accordance with a determination that the sign value 516 corresponds to a negative sign, the vector processor 202B selects the respective scalar of the predefined leak parameter. The predefined leak parameter β is smaller than 1. In some implementations, the one or more scalars includes 1 and a predefined filter-based scalar for a parametric ReLU 430. In accordance with a determination that the sign value corresponds to a positive sign, the vector processor 202B selects the respective scalar of 1, and in accordance with a determination that the sign value corresponds to a negative sign, the vector processor 202B selects the predefined filter-based scalar $\beta_i$. The predefined filter-based scalar $\beta_i$ is trained with weights and biases of the neural network.

Referring to FIG. 5, in some implementations, the one or more input vector registers 260 are configured to store the set of first elements 512 having a first number of M-bit elements in total. The output vector register 262 is configured to store the set of output elements 514 having a second number of M-bit elements. The second number is equal to the first number. The scalar register 264 has a single M-bit element, and is configured to store two N-bit scalars from which the respective scalar is selected. M is equal to 2N. For example, a pair of input vector registers 260 have 64 32-bit elements in total, so does the output vector register 262. The scalar register 264 has 32 bits for storing a first 16-bit scalar and a second 16-bit scalar corresponding to a positive sign and a negative sign of each first element 512, respectively.

In some implementations, the linear activation operation is implemented in parallel on the set of first elements 512 using single instruction, multiple data (SIMD). The set of first elements 512 optionally fills a subset or all of the one or more input vector registers 260. In some embodiments, the set of first elements 512 form a first feature vector 504, which includes the weighted combinations 502 of node inputs for all artificial nodes 320 of a neural network layer.

Optionally, the first feature vector 504 is loaded from the memory 258 of the electronic device 104 to the one or more input vector registers 260. Optionally, the first feature vector 504 is stored to the one or more input vector registers 260 in response to one or more preceding instructions (e.g., related to the weighted combination 322) and directly used in response to the single instruction. In response to the single instruction, the set of first elements 512 are extracted from the one or more input vector registers 260.

Alternatively, the set of first elements 512 includes a first set of first elements 512A. A first feature vector 504 includes the weighted combinations 502 of node inputs for all artificial nodes 320 of a neural network layer, and has more elements than a size of the one or more input vector registers 260. Stated another way, the first feature vector 504 has so many elements 502 that they do not fit in the one or more input vector registers 260 and have to be processed by more than one instruction. Based on a size of the one or more input vector registers 260, a first feature vector 504 is segmented to a plurality of sets of first elements 512 including the first set of first elements 512A and one or more remaining sets of first elements 512R. Each set of first elements 512 is either loaded from the memory 258 of the electronic device 104 to respective input vector registers 260 or previously stored to the respective input vector registers 260 in response to one or more preceding instructions, e.g., an addition operation implemented according to equation (1). The single instruction is repeated to implement the linear activation operation 520 on each of the one or more remaining sets of first elements 512R. Specifically, each single instruction corresponds to applying a linear activation function 324 on a single set of first elements 512, and the first feature vector 504 requires more than one instruction to be completely processed.

Further, in some implementations, output elements 514 of two distinct sets of first elements 512 are packed into the same output vector register 262. For example, in response to a first single instruction, a first set of output elements 514A generated from a set of first elements 512A are stored into a first portion of the output vector register 262. In response to a second single instruction, one of the remaining set(s) of first elements 512R are processed to generate a corresponding remaining set of output elements 514R, which are then stored into a second portion of the output vector register 262. The second portion is entirely distinct from the first portion without any overlapping. Alternatively, in some implementations, output elements 514 of each set of first elements 512 are packed into a distinct output vector register 262 without sharing the output vector register 262 with any other set of first elements 512.

Artificial nodes 320 of a corresponding neural network layer receives an input feature vector 530 (X) including a plurality of node inputs $x_1, x_2, \ldots$ and $x_n$. The first feature vector 504 is generated from the input feature vector 530 according to equation (1) and includes a plurality of weighted combinations 502 of node inputs $x_1, x_2, \ldots$ and $x_n$. Specifically, in accordance with equation (1), the vector processor 202B multiplies the input feature vector 530 with a weight matrix W to obtain an intermediate feature vector WX and adds a bias vector b to the intermediate feature vector WX to generate the first feature vector 504 including the set of first elements 512. Further, in some implementations, each element of the input feature vector 530 (X), weight matrix W, and bias vector b includes a fixed-point P-bit number. Prior to multiplying and adding, the vector processor 202B dequantizes each element of the input feature vector 530 (X), weight matrix W, and bias vector b to a fixed-point M-bit number. M is greater than P. In an example, M and P are equal to 32 and 8, respectively. In an example, the electronic device 104 includes a mobile device, and the weight matrix W and bias vector b have quantized P-bit elements and are stored in the memory 258 in association with the neural network layer to which the linear activation function 324 is applied. More details on quantization and dequantization of a neural network are explained below with reference to FIGS. 7A and 7B.

Figure 6:
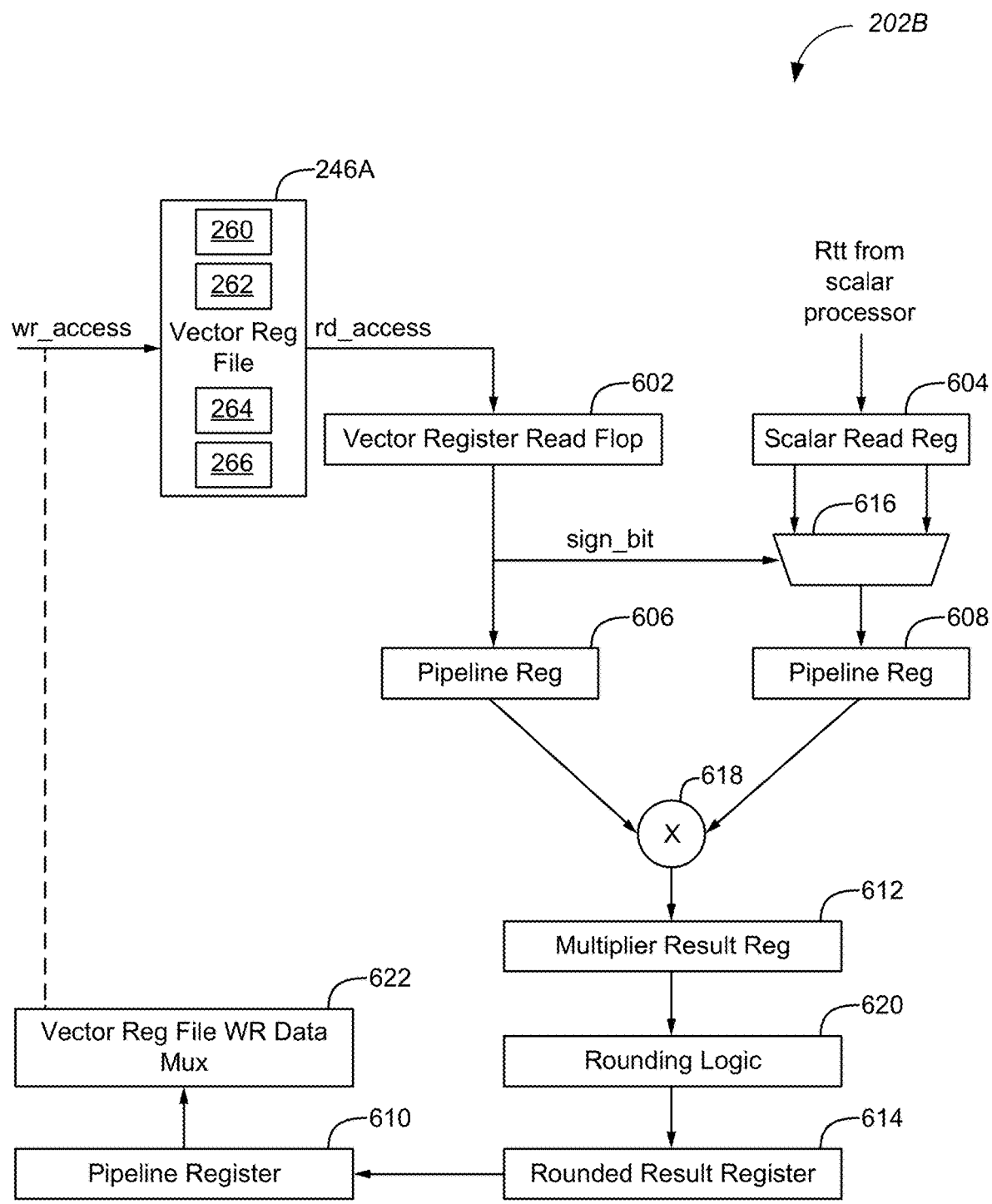
FIG. 6 is a block diagram of an example vector processor configured to implement a single instruction for a linear activation function associated with a neural network layer, in accordance with some implementations.

FIG. 6 is a block diagram of an example vector processor 202B configured to implement a single instruction for a linear activation function 324 associated with a neural network layer, in accordance with some implementations. For example, the single instruction is represented by vscale_relu($V_{uu}, R_t$):rnd:sat. In accordance with this single instruction, the vector processor 202B organizes a plurality of registers 246 and arithmetic units 248 to implement the single instruction without communicating with the instruction cache 243. The registers 246 include a vector register file 246A and a vector predicate file 246B. The vector register file 246A corresponds to one or more input vector registers 260, an output vector register 262, one or more scalar registers 264, and a plurality of intermediate result registers 266. The vector predicate file 246B stores predicates associated with each computational operation used to implement the single instruction, and semantics of the single instruction are translated to the vector predicate file 246B. The intermediate result registers 266 and arithmetic units 248 are organized according to the vector predicate file 246B, and coordinated to process inputs provided by the input vector registers 260 and scalar registers 264 and generate outputs stored in the output vector register 262 according to the single instruction for activation.

In an example, the intermediate result registers 266 include a vector register read flop 602, a scalar read register 604, pipeline register 606, 608, and 610, a multiplier result register 612, and a rounded result register 614. The plurality of arithmetic units 248 includes a scalar multiplexer 616, a multiplier 618, a rounding logic 620, and a data write multiplexer 622. Each arithmetic unit 248 is optionally a basic arithmetic logic unit (ALU) of a combination of two or more basic ALUs, and each basic ALU is a combinational digital circuit that performs arithmetic and bitwise operations on integer binary numbers.

Specifically, each element of the set of first elements 512 is extracted from the one or more input vector register 260. A sign value 516 is extracted and stored in the vector register read flop 602, and the respective element 512 is stored in the pipeline register 606. The scalar read register 604 stores the one or more scalar values extracted from a scalar register 264. The multiplexer 616 is controlled by the sign value 516 stored in the read flop 602 to select a respective scalar 518. The respective selected scalar 518 is stored in the pipeline register 608. The respective element 512 and selected scalar 518 stored in the pipeline registers 606 and 608 are multiplied to each other by the multiplier 618 to generate a scaled respective element 524 stored in the multiplier result register 612. The scaled respective element 524 are processed by the rounding logic 620 to generate a shifted respective element 528 stored in the rounded result register 614. The shifted respective element 528 is saturated to 32 bits to provide the respective output elements 514 stored in the pipeline register 610. The data write multiplexer 622 writes the respective output elements 514 stored in the pipeline register 610 to a corresponding element of the output vector register 262.

The vector processor 202B implements the single instruction using conditional scaling based on a sign value 516 of each first element 512 and a corresponding scalar 518. Such conditional scaling includes at least three computational operations (comparison, multiplexing, and scaling), and these operations are implemented in response to the single instruction, rather than individual sequential instructions arranged in an instruction queue of an instruction cache 243. Further, conditional scaling is configured to implement a variety of activation functions 324 based on a linear unit using different scale values, e.g., based on ReLUs 410, 420, 430, or 440 in FIG. 4A or 4B. In quantized inference computation, a single instruction can be used to perform de-quantization scaling along with the activation function scale. In an example, processor resources are reused in each computational stage to achieve three times expedition, thereby managing workloads of neural network inference in an efficient manner. In addition to implementation of linear activation functions for neural networks, conditional scaling can also be used in non-machine learning applications requiring scaling of elements a vector by scalar values based on a sign of each vector element.

Figure 7A:
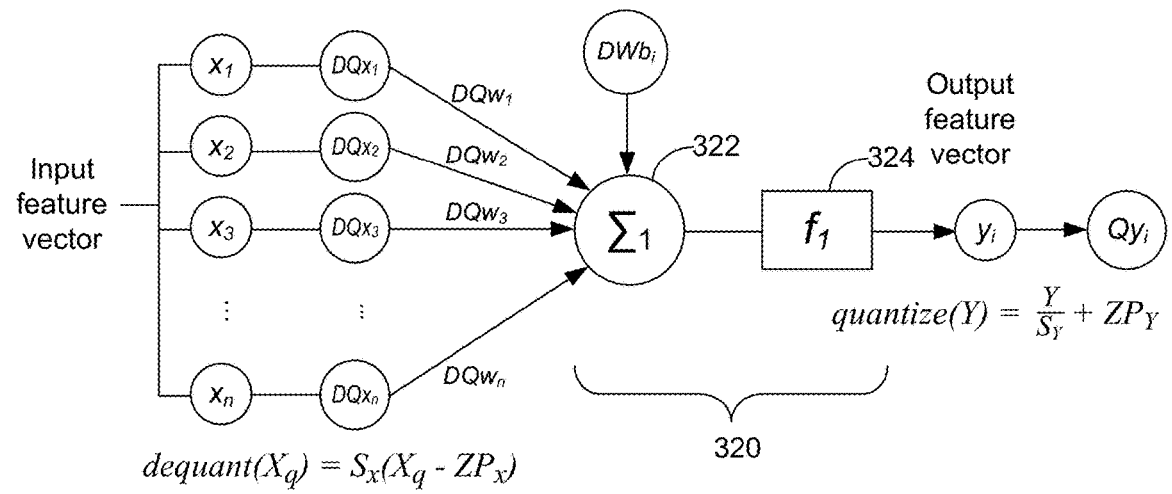
FIG. 7A is an example artificial neuron involving a sequence of neural network operations (e.g., quantization, dequantization), in accordance with some implementations.
Figure 7B:
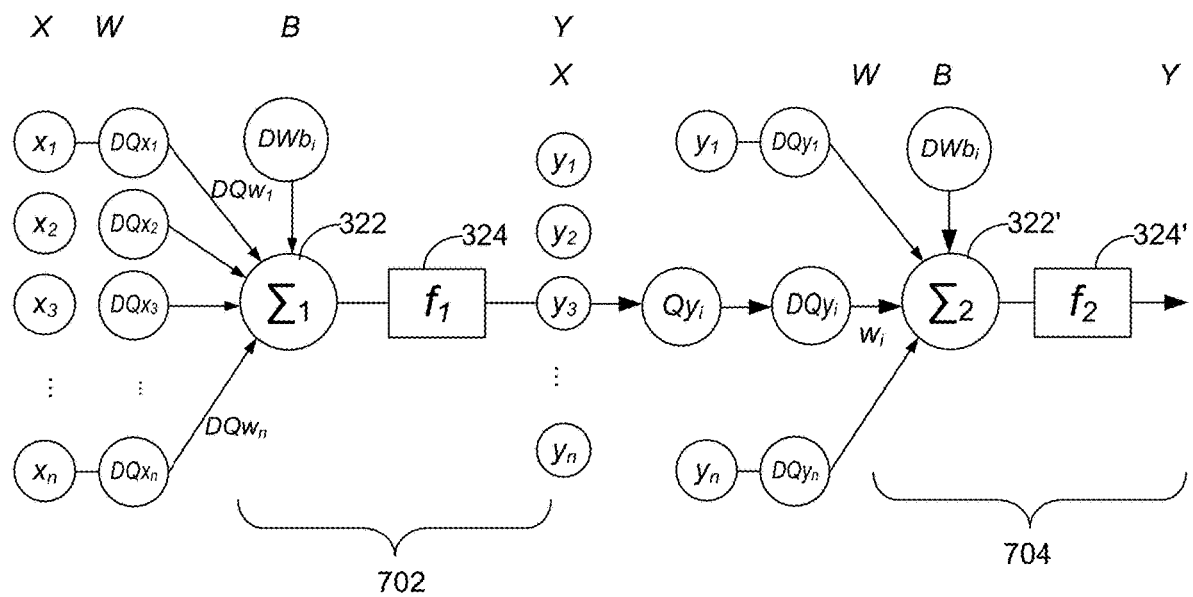
FIG. 7B is two example artificial neurons coupled in series and involving a sequence of neural network operations, in accordance with some implementations.

FIG. 7A is an example artificial neuron 320 involving a sequence of neural network operations (e.g., quantization, dequantization), in accordance with some implementations, and FIG. 7B is two example artificial neurons 320 coupled in series and involving a sequence of neural network operations, in accordance with some implementations. As explained above, the neural network 300 includes a collection of artificial neuron 320 that are connected by links 312 and organized into one or more layers (e.g., an input layer 302, hidden layer 304, output layer 306). Each artificial neuron 320 receives one or more node inputs $x_1$, $x_2$, $x_3$, ... and $x_n$ and generate a node output $y_i$ from the one or more node inputs based on a propagation function. The propagation function includes an activation function 324 applied on a linear weighted combination 322 of the one or more node inputs $x_1$, $x_2$, $x_3$, ... and $x_n$. Specifically, the one or more node inputs $x_1$, $x_2$, $x_3$, ... and $x_n$ of each artificial node 320 are combined based on corresponding weights $w_1$, $w_2$, $w_3$, ... and $w_n$ and a node bias $b_i$.

In some implementations, an electronic device 104 implements the neural network 300 at a low precision level (e.g., using a 8-bit fixed point representation) to reserve limited computational, storage, or power resources. Weights $w_i$, node biases $b_i$, node inputs $x_i$, and node outputs $y_i$ of each the neural network layer are quantized and stored at the low precision level, while neural network computation is implemented at a high precision level (e.g., using a 32-bit fixed point representation). That said, when the propagation function is implemented at each artificial neuron 320, each of the weights $w_1$, $w_2$, $w_3$, ... and $w_n$, node bias $b_i$, and node inputs $x_1$, $x_2$, $x_3$, ... and $x_n$ is dequantized to a respective weight $DQw_1$, node bias $DQb_i$, or node input $DQx_i$ at the high precision level. The dequantized weights $DQw_1$, $DQw_2$, $DQw_3$, ... and $DQw_n$, node bias $DQb_i$, and node inputs $DQx_1$, $DQx_2$, $DQ x_3$, ... and $DQx_n$ are combined to the linear weighted combination 322 and processed using the activation function 324 to generate the node output $y_i$ at the high precision level. The node output $y_i$ of the respective artificial neuron 320 is quantized to $Qy_i$ at the low precision level. The quantized node output $Qy_i$ is provided to a next layer 704 of the neural network 300 as an element of an input feature vector X or outputted from the neural network 300.

For a layer immediately following a fully connected layer, the weight matrix W, input feature vector X, bias vector b are quantized to $W_q$, $X_q$, $b_q$ using affine integer quantization. The propagation function of the layer immediately following the fully connected layer is modified as follows:

$$Y = f(\text{dequant}(W_q) \, \text{dequant}(X_q) + \text{dequant}(b_q)) \quad (3)$$

where dequant($X_q$) is defined as:

$$DQ_i = \text{dequant}(X_q) = S_x(X_q - ZP_x) \quad (4)$$

where $S_x$ is a quantization scale and $ZP_x$ is a quantization zero-point for X. After elements of the output feature vector Y have been computed at the high precision level, the output feature vector Y is quantized to the low prevision level as follows:

$$Y_q = \text{quantize}(Y) \quad (5)$$

where quantize(Y) is defined as:

$$Qy_i = \text{quantize}(Y) = \frac{Y}{S_Y} + ZP_y \quad (6)$$

where $S_y$ is a quantization scale and $ZP_y$ is a quantization zero-point for Y. The quantized node output $Qy_i$ is an element of the quantized output feature vector Y.

For each neural network layer, the quantized output feature vector Y is optionally stored in an output vector register 262 of a last instruction that generates the quantized output feature vector Y, and applied directly in a next instruction that uses the quantized output feature vector Y. Alternatively, in some implementations, the quantized output feature vector Y is moved from the output vector register 262 associated with the last instruction to the memory 258. When the next instruction (e.g., a dequantization instruction) using the quantized output feature vector Y is initiated, the quantized output feature vector Y is loaded from the memory 258 to one or more input registers 260 associated with the next instruction.

Referring to FIG. 7B, in some implementations, the artificial neurons 320 belong to a first layer 702 and a next layer 704 that immediately follows the first layer 702. The quantized node output $Qy_i$ of the artificial neuron 320 of the first layer 702 is provided to the next layer 704 of the neural network 300 as an element of an input feature vector X. In the next layer 704, a second propagation function includes a second activation function 324' and a second linear weighted combination 322' of one or more node inputs $x_1$, $x_2$, $x_3$, ... and $x_n$, which are node outputs $y_1$, $y_2$, $y_3$, ... and $y_n$ of the first layer 702. In the next layer 704, the node outputs $y_1$, $y_2$, $y_3$, ... and $y_n$ of the first layer 702 are further combined based on corresponding weights $w_1$, $w_2$, $w_3$, ... and $w_n$ and a node bias $b_i$ of the next layer 704.

Likewise, when the second propagation function is implemented at each artificial neuron 320 of the next layer 704, each of the weights $w_1$, $w_2$, $w_3$, ... and $w_n$ and node bias $b_i$ of the next layer 704 is dequantized to a respective weight $DQw_i$ or node bias $DQb_i$. Each of the node outputs $Qy_i$ of the first layer 702 is dequantized to a respective node outputs $DQy_i$ at the high precision level. The dequantized weights $DQw_1$, $DQw_2$, $DQw_3$, ... and $DQw_n$ and node bias $DQb_i$ of the next layer 704 and node outputs $DQy_1$, $DQy_2$, $DQy_3$, ... and $DQy_n$ of the first layer 702 are combined into the linear weighted combination 322' and processed using the second activation function 324' to generate the node output $y_1$ of the next layer 704 at the high precision level. The node output $y_1$ of the next layer 704 is quantized to $Qy_i$.

In some implementations, results of the linear weighted combination 322 or 322' are stored in an output vector register 262 in response to an instruction associated with the linear weighted combination 322. Upon receiving a single instruction to implementing the following linear activation function 324 or 324', the output vector register 262 is reconfigured to one or more input vector register 260 of the single instruction, and the results of the linear weighted combination 322 or 322' are directly extracted to be processed by a corresponding linear activation operation (e.g., in the process 500). Alternatively, in some implementations, the results of the linear weighted combination 322 or 322' are stored in an output vector register 262 and moved to the memory 258 of a corresponding processor 202 (e.g., a vector processor 202B). Upon receiving a single instruction to implementing the linear activation function 324 or 324', the results of the linear weighted combination 322 or 322' are loaded from the memory 258 to one or more input vector register 260 of the single instruction for the corresponding linear activation operation.

Figure 8:
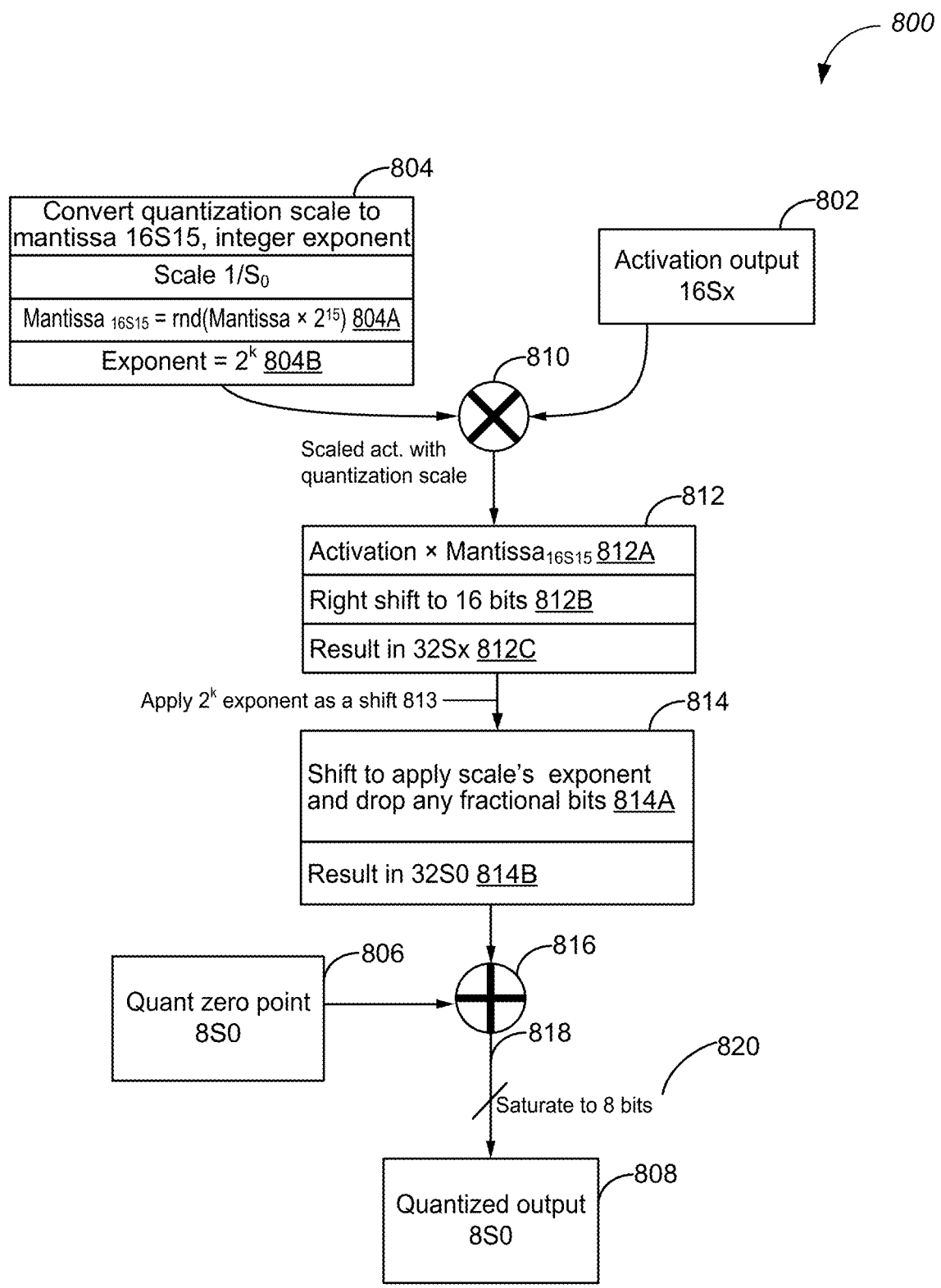
FIG. 8 is a flow diagram of a process of implementing a quantization operation on data elements of a neural network in response to a single instruction, in accordance with some implementations.

FIG. 8 is a flow diagram of a process 800 of implementing a quantization operation on data elements of a neural network in response to a single instruction, in accordance with some implementations. For each neural network layer, node output $y_i$ form an activation output vector Y (802), and the quantization operation is applied on each individual element $y_1$ of the activation output vector Y (802) based on equations (5) and (6), i.e., based on a quantization factor $$\frac{1}{S_Y}$$

(804) and a zero point $ZP_y$ (806). Stated another way, for each neural network layer, the activation output vector Y (802) acts as an input feature vector 802 of the quantization action. A subset of elements of the input feature vector 802 are stored in one or more input vector registers 260. The vector processor 202B is configured to quantize the subset of elements of the input feature vector 802 based on the quantization factor 804 and zero point 806. Corresponding set of quantized elements form a subset of an output feature vector 808, and are stored in an output vector register 262. Particularly, a sequence of computational operations are initiated by the corresponding single instruction for quantization, and performed on the subset of elements of the input feature vector 802 in parallel using a processor 202 (e.g., a vector processor 202B).

During the quantization operation, the quantization factor 804 is converted to a mantissa 804A and an integer exponent 804B. The mantissa 804A is a fixed-point number. In an example, the mantissa 804A is denoted as 16S15, indicating that the mantissa 804A is a 16-bit fixed-point number with a sign bit and 15 fractional bits, and has a value in a range of $[-1, 1-2^{-15}]$. Each element $y_i$ of the input feature vector 802 is multiplied (810) by the quantization factor 804, which is implemented by a sequence of computational operations 812-814 of the processor 202. Specifically, the respective element $y_i$ is multiplied by the mantissa 804A to obtain a respective scaled element 812A, and the scaled element 812A is shifted (812B), e.g., right shifted by 16 bits, based on the integer exponent 804B. In an example, the element $y_i$ is denoted as 16Sx, where x is a positive integer number. The mantissa 804A is denoted as 16S15, and therefore, a shifted element 812C is denoted as 32Sx. Another shift (e.g., a saturating left shift, a rounded right shift) is applied to the shifted element 812C based on the integer exponent 804B (i.e., $2^k$), and one or more fractional bits are dropped (814A) to get a respective M-bit integer 814B, e.g., a 32-bit integer. The zero point 806 is added (816) to the respective M-bit integer 814B to obtain a respective offset integer 818. The respective offset integer 818 is saturated (820) to a quantized P-bit element 908 (e.g., a quantized 8-bit element) to be stored into an element of the output vector register 262.

In some implementations, the single instruction associated with an quantization operation is represented by vmap_wb. This vmap_wb instruction is issued from the instruction cache 243. In response to the vmap_wb instruction, each element $y_i$ of a subset of the input feature vector 802 is processed by an ordered sequence of computational operations 812, 814, 816, and 820. Each computational operation (e.g., 812A) is optionally implemented by a basic ALU or a combination of two or more basic ALUs.

Figure 9:
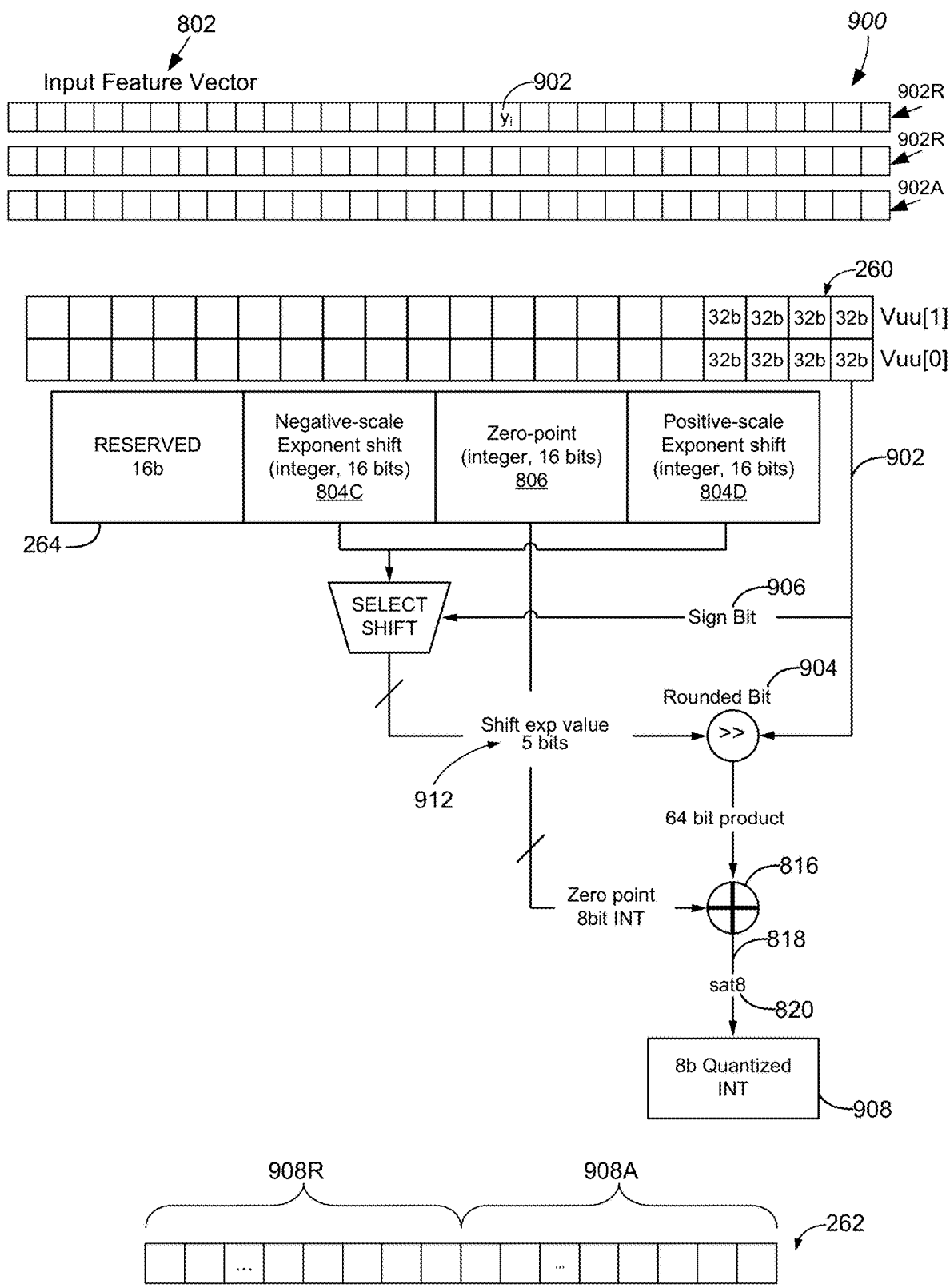
FIG. 9 is a flow diagram of a process of implementing a quantization operation in response to a single instruction in a vector processor, in accordance with some implementations.

FIG. 9 is a flow diagram of a process 900 of implementing a quantization operation in response to a single instruction in a vector processor 202B, in accordance with some implementations. As explained above, a node output $y_i$ at each artificial neuron 320 is quantized according to equations (5) and (6). For each neural network layer, the node outputs $y_i$ of corresponding artificial nodes 320 form an input feature vector 802 that is obtained and quantized by the vector processor 202B. Each node output $y_i$ is processed by a rounded shift operation 904, an addition operation 816, and a saturation operation 820 sequentially. The rounded shift operation 904 is conditioned on a sign value 906 of each node output $y_i$. Particularly, these computational operations are initiated by the single instruction for quantizing a subset of elements of the input feature vector 802 corresponding to output nodes of the neural network layer.

Specifically, the single instruction corresponds to the one or more input vector registers 260, an output vector register 262, and a scalar register 264. The one or more input vector registers 260 store a set of M-bit elements 902, e.g., a subset of node output $y_i$ of a neural network layer. The single instruction includes a quantization factor 804 and a zero point 806, and the scalar register 264 stores the quantization factor 804 and zero point 806. The quantization operation includes at least a multiplication with the quantization factor 804 and an addition with the zero point 806 based on equation (6). In response to the single instruction, the quantization operation is implemented on the set of M-bit elements 902 stored in and extracted from the one or more input vector registers 260 to generate a set of P-bit elements 908. Each M-bit element 902 is quantized from M bits to P bits of a respective P-bit element 908. For example, a 32-bit element 902 is quantized to a 8-bit element 908. In the vector processor 202B, this quantization operation is implemented by way of a combination of the rounded shift operation 904, addition operation 816, and saturation operation 820.

The quantization factor 804 includes a first exponent shift value 804C and a second exponent shift value 804D. The vector processor 202B detects a sign value 906 of each element of the set of M-bit elements 902, and selects a respective exponent shift value 804C or 804D stored in the scalar register 264 based on the sign value 906. The vector processor 202B then applies the rounded shift operation 904 on the respective scaled element 812A of each element of the set of first elements 512 based on the selected respective exponent shift value 804C or 804D. An example rounded shift operation 904 is described as follows:

```
rshift( a, n ):
    if n > 0:
        round_bias=( 1 <<(n-1) )
        out = ( a + round_bias ) >> n
    else:
        out = sat( a << (-n) )
``` where a is a scaled element 812A that is scaled from the element 902, and n is the selected exponent shift value 912 (i.e., 804C or 804D). More specifically, in accordance with a determination that the selected one of the first and second exponent shift values 912 is positive, the vector processor 202B applies a rounded right shift to the respective scaled element 812A based on the selected one of the first and second exponent shift values 912. Conversely, in accordance with a determination that the selected one of the first and second exponent shift values is negative, the vector processor 202B applies a saturating left shift to the respective scaled element 812A based on the selected one of the first and second exponent shift values 912.

In response to the single instruction associated with quantization, the set of M-bit elements 902 loaded into the one or more input registers 260 are processed in parallel, e.g., using SIMD and in the vector processor 202B. In some embodiments, the set of M-bit elements 902 optionally fill a subset or all of the one or more input vector registers 260. The set of M-bit elements 902 form an input feature vector 802, which includes the node outputs $y_i$ for all artificial nodes 320 of a neural network layer. Optionally, the set of M-bit elements 902 of the input feature vector 802 are loaded from the memory 258 of the electronic device 104 to the one or more input vector registers 260. Optionally, the set of M-bit elements 902 of the input feature vector 802 are stored to the one or more input vector registers 260 in response to one or more preceding instructions (e.g., a single instruction associated with a linear activation operation in FIG. 5). After the one or more preceding instructions, the set of M-bit elements 902 are extracted from the input vector registers 260 and directly used in response to the single instruction associated with quantization.

Alternatively, in some implementations, the set of M-bit elements 902 including a first set of M-bit elements 902A, and the set of P-bit elements including a first set of P-bit elements 908A. An input feature vector 802 includes node outputs for all artificial nodes 320 of a neural network layer to be quantized, and has more elements than a size of the one or more input vector registers 260. Stated another way, the input feature vector 802 has so many elements that they do not fit in the one or more input vector registers 260 and have to be processed in more than one instruction. Based on a size of the one or more input vector registers 260, an input feature vector 802 is segmented to a plurality of sets of M-bit elements including the first set of M-bit elements 902A and one or more remaining sets of M-bit elements 902R. Optionally, each set of M-bit elements 902 are loaded from the memory 258 of the electronic device 104 to respective input vector registers 260. Optionally, each set of M-bit elements are stored to the respective input vector registers 260 in response to one or more preceding instructions (e.g., a single instruction associated with a linear activation operation in FIG. 5). The single instruction is repeated to quantize each of the one or more remaining sets of M-bit elements 902R to generate a respective remaining set of P-bit elements 908R.

Additionally, if the input feature vector 802 is segmented to a number of sets of M-bit elements 512, the single instruction is repeated for the same number of times to quantize the input feature vector 802. Stated another way, a sequence of instructions including the same number of instructions are implemented successively to quantize the input feature vector 802 completely. In response to each single remaining instruction associated with each remaining set of M-bit elements 902R, the vector processor 202B obtains a respective remaining set of M-bit elements 902R of the input feature vector 802 from the respective input vector registers 260. Each of the respective remaining set of M-bit elements is quantized from M-bits to P bits of a respective element of the respective remaining set of P-bit element 908, which are packed into a single register element of 32 bits. The one or more input vector registers 260 include a pair of 32 register elements each having 32 bits. The output vector register 262 includes 16 register elements each having 32 bits. In response to the single instruction, the output vector register 262 is entirely filled.

In an example, a pair of input vector registers 260 and a corresponding output vector register 262 have 32-bit elements. Two sets of 32-bit elements stored in the registers 260 are quantized to 8-bit elements in the register 262 by two variants of a vmap_wb instruction as follows:

```
Vx.h=vmap_wb(Vuu,Rtt):rnd:sat    int i;
                                  for (i=0;i<64;i++) {
                                    size2s_t exponent=Vuu.V32s[i]>0?
                                    GETHALF(0,GETWORD(0,Rtt)):GETHALF(0,GETWORD(1,Rtt));
                                    short sh = ABS(exponent)&0x1f;
                                    short bias = GETHALF(1,GETWORD(0,Rtt));
                                    int rnd_val = sh && exponent<0? (1<<(sh-1)) : 0;
                                    size8s_t vtmp0 = SAT32((size8s_t)(Vuu.V32s[i])+rnd_val);
                                    size8s_t vtmp1 = (exponent<0)?(vtmp0 >> sh):SAT32(vtmp0 << sh);
                                    Vx.V8s[64+i]=SAT8(vtmp1 + bias);
                                  }
Vx.l=vmap_wb(Vuu,Rtt):rnd:sat    int i;
                                  for (i=0;i<64;i++) {
                                    size2s_t exponent=Vuu.V32s[i]>0?
                                    GETHALF(0,GETWORD(0,Rtt)):GETHALF(0,GETWORD(1,Rtt));
                                    short sh = ABS(exponent)&0x1f;
                                    short bias = GETHALF(1,GETWORD(0,Rtt));
                                    int rnd_val = sh && exponent<0? (1<<(sh-1)) : 0;
                                    size8s_t vtmp0 = SAT32((size8s_t)(Vuu.V32s[i])+rnd_val);
                                    size8s_t vtmp1 = (exponent<0)?(vtmp0 >> sh):SAT32(vtmp0 << sh);
                                    Vx.V8s[0+i]=SAT8(vtmp1 + bias);
                                  }
``` elements 908R. The respective remaining set of P-bit elements 908R are packed into a respective output vector register 262. Further, in some implementations, the single instruction associated with the first set of M-bit elements 902A corresponds to a first instruction flavor, and at least one single remaining instruction corresponds to a second instruction flavor. The respective remaining set of P-bit elements 908R are generated in response to the at least one single remaining instruction. Referring to FIG. 9, the first set of P-bit elements 908A and the respective remaining set of P-bit elements 908R are packed in a first half and a second half of the output vector register 262, respectively.

The one or more input vector registers 260 are configured to store a first number of M-bit elements 902. The output vector register 262 is configured to store a second number of N-bit elements. The second number is equal to or less than the first number. The output vector register 262 is partially or entirely filled by the set of P-bit elements 908. A quantization ratio is M/X. A space ratio of the input and output registers 260 and 262 is equal to or greater than M/X. In an example, the first and second numbers are equal to 64 and 32, respectively. M and N are both equal to 32, and P is equal to 4. Every N-bit element in the output vector register 262 stores up to 4 quantized P-bit element 908. The one or more input vector registers 260 include a pair of 32 register elements each having 32 bits. The output vector register 262 includes 32 register elements each having 32 bits. In response to the single instruction having one of two predefined flavors, a corresponding half of the output vector register 262 is filled. In another example, the first and second numbers are equal to 64 and 16, respectively. M and N are both equal to 32, and P is equal to 4. Every N-bit element in the output vector register 262 stores up to 4 quantized P-bit The single instruction is implemented based on an input vector register pair 260 (Vuu) having 64 32-bit elements, a scalar register pair 264 (Rtt) having 4 16-bit elements, and an output vector register 262 (Vx) having 32 32-bit elements. Half of the output vector register 262 is filled as a result of execution of the single instruction. The scalar register 264 includes Rtt.h[2] and Rtt.h[0] storing exponent shift values 804C and 804D and Rtt.h[1] storing a zero-point 806. The exponent shift values 804C and 804D are applied to the set of M-bit elements 902 (Vuu) extracted from the input vector registers 260 via the rounded shift operation 904 (which corresponds to the shift in operation 813 in FIG. 8). Each M-bit element (Vuu) is shifted based on the exponent shift value 804C or 804D, (i.e., Rtt.h[2] or Rtt.h [0]). If a sign value 906 of the respective M-bit element 902 (Vuu) is positive, the scaled element 812A of the respective M-bit element 902 (Vuu) is processed with a shift using the first exponent shift value 804C. The shift is a rounded right shift if the first exponent shift value 804C is positive, and a saturating left shift if the first exponent shift value 804C is negative. Conversely, if a sign value 906 of the respective M-bit element (Vuu) is negative, the scaled element 812A of the respective M-bit element 902 (Vuu) is processed with a shift using the second exponent shift value 804D. The shift is a rounded right shift if the second exponent shift value 804D is positive, and a saturating left shift if the second exponent shift value 804D is negative.

In some implementations, the set of M-bit elements 902 correspond to node outputs of an output layer 306 of the neural network 300. The output layer 306 generates the input feature vector 802, which is quantized in the process 900 to an output feature vector 808 including the set of P-bits 908. The set of P-bit elements 908 of the output feature vector 808 are stored in the memory 258 of the electronic device 104. Such quantized elements 908 help reserve storage resources of the electronic device 104, particularly if the electronic device 104 is a mobile device. As a result, such a single instruction requires a minimal scratch memory footprint for holding layer outputs.

In some implementations, referring to FIG. 7B, the set of M-bit elements 902 correspond to node outputs of a first layer 702, which is an input layer 302 or hidden layer 304 of the neural network 300. A second layer 704 is coupled to and immediately follows the first layer 702. The input feature vector 802 is generated from the first layer 702 and quantized to an output feature vector 808 including the set of P-bit elements 908. The second layer 704 obtains the output feature vector 808, e.g., directly from the output vector register 262, to generate weighted combinations of the set of P-bit elements 908, after the output feature vector 808 is quantized from the input feature vector. The second layer 704 includes a plurality of weights and biases, and each of the plurality of weights, biases, and elements 908 of the output feature vector 808 includes a P-bit fixed-point number. Each P-bit fixed-point number is dequantized, such that the second layer 704 is applied on the output feature vector 808 using the dequantized weights, dequantized biases, and dequantized elements of the output feature vector 808 to generate a second input vector. In response to a second single instruction, a subset of the second input vector is quantized using the process 900. As such, quantized P-bit elements 908 need to be stored with appropriate ordering in the output vector register 262 or memory 258 for immediate loading and de-quantization associated with the second layer 704.

In some implementations, a single activation-quantization instruction is applied to implement an activation function 324 on a weighted combination 322 (i.e., first elements 512 in FIG. 5) and a quantization operation on a node output $y_i$, successively and without being interrupted by communication with the instruction cache 243. Particularly, when the SIMD is applied, a subset of a first feature vector 504 is processed by the activation function 324, quantized, and packed in an output vector register 262 in response to the single activation-quantization instruction. As the first feature vector 504 is segmented to a plurality of subsets of elements, the single activation-quantization instruction is repeated for each subset of first elements 512 until all elements of the first feature vector 512 are processed.

Figure 10:
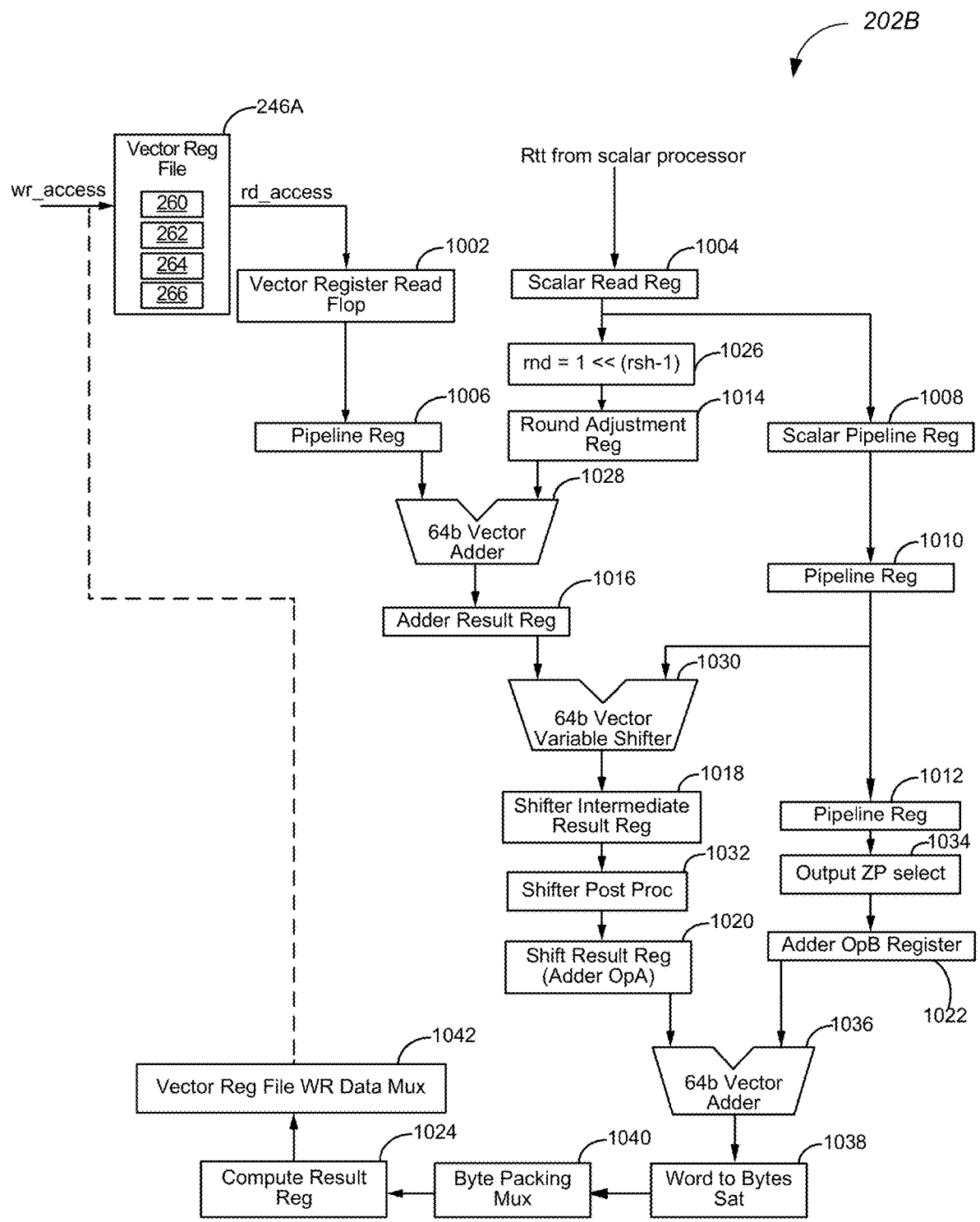
FIG. 10 is a block diagram of an example vector processor configured to implement a single instruction for quantization associated with a neural network layer, in accordance with some implementations.

FIG. 10 is a block diagram of an example vector processor 202B configured to implement a single instruction for quantization associated with a neural network layer, in accordance with some implementations. In accordance with this single instruction for quantization, the vector processor 202B organizes a plurality of registers 246 and arithmetic units 248 to implement the single instruction without being interrupted by communication with the instruction cache 243 during quantization. The registers 246 include a vector register file 246A and a vector predicate file 246B. The vector register file 246A corresponds to one or more input vector registers 260, an output vector register 262, one or more scalar registers 264, and a plurality of intermediate result registers 266. The vector predicate file 246B stores predicates associated with computational operations used to implement the single instruction, and semantics of the single instruction are translated to the vector predicate file 246B. The intermediate result registers 266 and arithmetic units 248 are organized according to the vector predicate file 246B, and coordinated to process inputs provided by the input vector registers 260 and scalar registers 264 and generate quantized outputs stored in the output vector register 262 according to the single instruction for quantization.

In an example, the intermediate result registers 266 include a vector register read flop 1002, a scalar read register 1004, pipeline registers 1006-1012, a round adjustment register 1014, an adder result register 1016, a shifter intermediate result register 1018, a shift result register 1020, an adder operation register 1022, and a compute result register 1024. The plurality of arithmetic units 248 include a rounding adjuster 1026, a vector adder 1028, a vector variable shifter 1030, a shifter postprocessor 1032, an output zero point selector 1034, a vector adder 1036, a saturator 1038, a byte packing multiplexer 1040, and a write data multiplexer 1042. Each arithmetic unit 248 is optionally a basic ALU or a combination of two or more basic ALUs, and each basic ALU is a combinational digital circuit that performs arithmetic and bitwise operations on integer binary numbers.

Specifically, each element of the set of M-bit elements 902 is extracted from the one or more input vector register 260. A sign value 906 is extracted and stored in the vector register read flop 1002, and the respective M-bit element 902 is stored in the pipeline register 1006. The scalar read register 1004 stores information associated with the quantization factor 804 and zero point 806 extracted from a scalar register 264. The quantization factor 804 is processed by the rounding adjuster 1026, shifter 1030, and postprocessor 1032 to obtain an M-bit integer 814B stored in the shift result register 1020. The zero point 806 is passed by the pipeline registers 1008-1012, selected by the output zero point selector 1034, and stored in the adder operation register 1022. The adder 1036 adds the zero point 806 stored in the adder operation register 1022 to the respective M-bit integer 814B stored in the shift result register 1020 to obtain a respective offset integer 818, which is saturated by the saturator 1038 to a quantized P-bit element 908 (e.g., a quantized 8-bit element). The quantized P-bit element 908 is further packed into compute result register 1024 by the packing multipexer 1040 to be stored into the output vector register 262.

In some implementations, quantized P-bit elements 908 are packed in an output vector register 262 to enable consistent operations for each neural network layer. In an example, these P-bit elements 908 are packed in an order that is consistent with that of the set of M-bit elements 902 in the input feature vector 802, so are these P-bit elements 908 closely packed without zero padding. Instructions are executed with resources orthogonal to multipliers to enable pipeline optimizations in a quantization based inference path. Stated another way, these instructions do not use multiplier resources while some relevant computation (e.g., a step in the same quantization based inference path for a next input vector) must be implemented using multipliers. The instructions save the multiplier resources to implement the relevant computation concurrently with these instructions, thereby facilitating or facilitating pipelining the quantization based inference path. Quantization implemented based on the single instruction includes scaling an accumulator result by fixed point multiplication, shifting by exponent, bias addition, and saturation. As such, the single instruction for quantization fuses multiple computational operations, enables pipelining and packing efficiently, and reduces a cycle cost for computing a quantized inference model at an electronic device 104 having limited resources (e.g., a mobile device).

Figure 11:
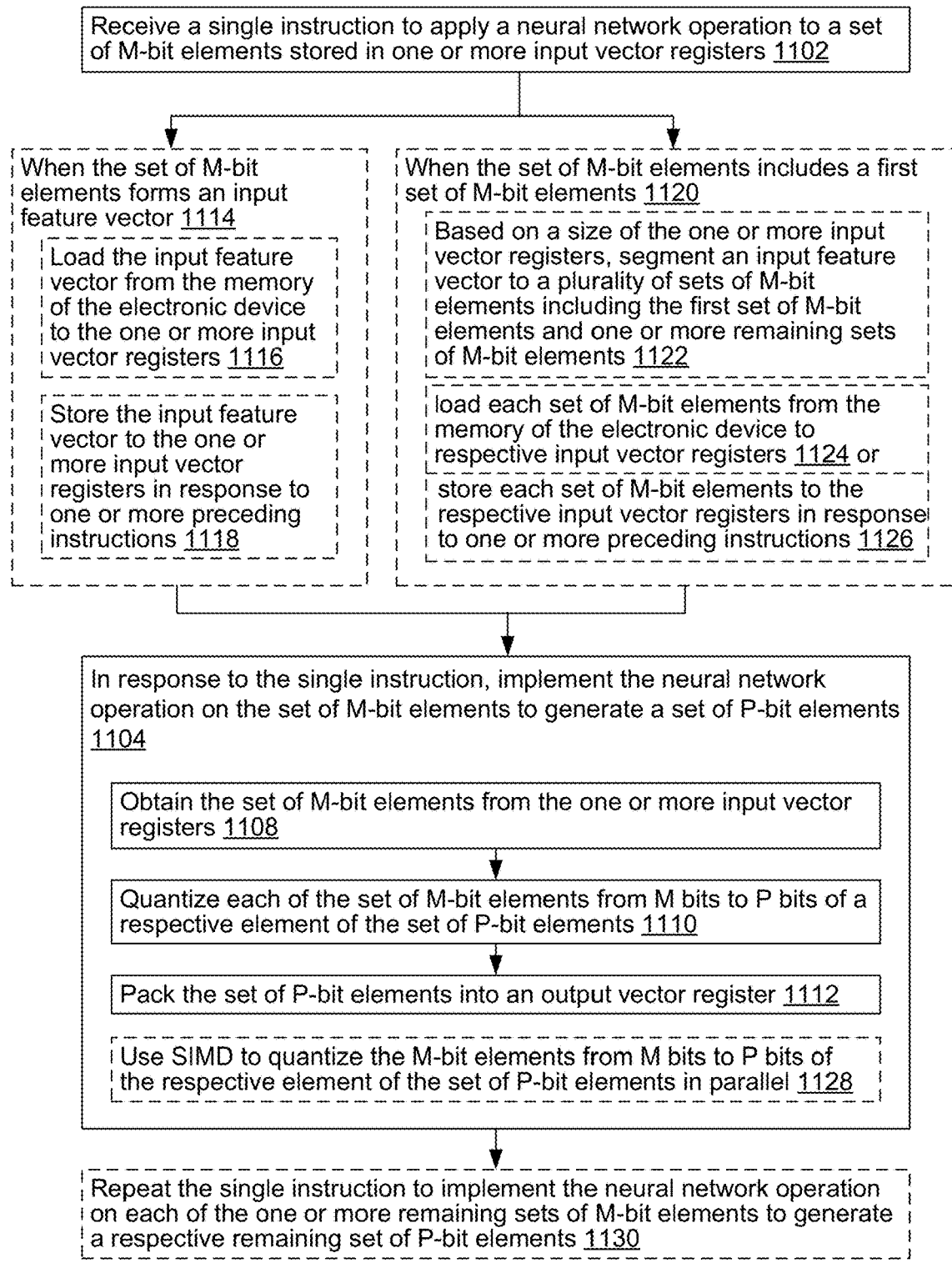
FIG. 11 is a flow diagram of a method for quantizing features of a layer of a neural network, in accordance with some implementations.

FIG. 11 is a flow diagram of a method 1100 for quantizing features of a layer of a neural network, in accordance with some implementations. For convenience, each of the method 1100 is described as being implemented by a processor of an electronic device 104. Each of the method 1100 is, optionally, governed by instructions that are stored in a non-transitory computer readable storage medium (e.g., quantization module 242 in FIG. 2A) and that are executed by one or more processors (e.g., a vector processor 202B in FIG. 2B) of the electronic device 104. Each of the operations shown in FIG. 1100 may correspond to instructions stored in a computer memory or non-transitory computer readable storage medium (e.g., memory 206 in FIG. 2). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1100 may be combined and/or the order of some operations may be changed.

The electronic device 104 receives (1102) a single instruction to apply a neural network operation to a set of M-bit elements 902 stored in one or more input vector registers 260. In response to the single instruction, the electronic device 104 implements (1104) the neural network operation on the set of M-bit elements 902 to generate a set of P-bit elements 908. P is smaller than M. Specifically, in response to the single instruction, the electronic device 104 obtains (1108) the set of M-bit elements 902 from the one or more input vector registers 260, quantizes (1110) each of the set of M-bit elements 902 from M bits to P bits of a respective element of the set of P-bit elements 908, and packs (1112) the set of P-bit elements 908 into an output vector register 262.

In some implementations, the set of M-bit elements 902 form (1114) an input feature vector 802. The electronic device 104 loads (1116) the input feature vector 802 from the memory 258 of the electronic device to the one or more input vector registers 260 or stores (1118) the input feature vector 802 to the one or more input vector registers 260 in response to one or more preceding instructions. For example, the one or more preceding instructions include one or more linear activation instructions applied on elements of a feature vector to generate the first set of M-bit elements 902. The elements of the feature vector that are processed by the one or more linear activation functions are stored in one or output vector registers associated with the one or more linear activation instructions. The one or more output vector registers associated with the one or more linear activation instructions are directly applied as the or more input vector registers 260 of the single instruction associated with quantization, and activated elements of the feature vector stored in the output vector register(s) are extracted and quantized in response to this single instruction.

Alternatively, in some implementations, the set of M-bit elements 902 includes (1120) a first set of M-bit elements 902A, and the set of P-bit elements 908 includes a first set of P-bit elements 908A. Based on a size of the one or more input vector registers 260, the electronic device 104 segments (1122) an input feature vector 802 to a plurality of sets of M-bit elements 902 including the first set of M-bit elements 902A and one or more remaining sets of M-bit elements 902R. The electronic device loads (1124) each set of M-bit elements 902 from the memory of the electronic device to respective input vector registers 260 or stores (1126) each set of M-bit elements 902 to the respective input vector registers 260 in response to one or more preceding instructions, and repeats (1130) the single instruction to implement the neural network operation on each of the one or more remaining sets of M-bit elements 902R to generate a respective remaining set of P-bit elements 908R. In some implementations, the one or more preceding instructions include one or more linear activation instructions applied on elements of a feature vector to generate the first set of M-bit elements 902.

Further, in some implementations, in response to each single remaining instruction, the electronic device 104 obtains a respective remaining set of M-bit elements 902R of the input feature vector 802 from the respective input vector registers 260, quantizes each of the respective remaining set of M-bit elements 902R from M-bits to P bits of a respective element of the respective remaining set of P-bit elements 908R, and packs the respective remaining set of P-bit elements 908R into a respective output vector register 262. Additionally, in some implementations, the single instruction associated with the set of M-bit elements 902 corresponds to a first instruction flavor, and at least one single remaining instruction corresponds to a second instruction flavor. The respective remaining set of P-bit elements 908R are generated in response to the at least one single remaining instruction, and the first set of P-bit elements 908A and the respective remaining set of P-bit elements 908R are packed in a first half and a second half of the output vector register 262, respectively.

In some implementations, referring to FIG. 8, the single instruction includes a quantization factor 804 and a zero point 806, and the neural network operation is a quantization operation including at least a multiplication with the quantization factor 804 and an addition with the zero point 806, the addition following the multiplication. Further, in some implementations, during quantization, the electronic device 104 converts the quantization factor 804 to a mantissa 840A and an integer exponent 804B. For each of the set of M-bit elements 902, the electronic device 104 then sequentially multiplies the respective M-bit element with the mantissa 804A to obtain a respective scaled element, shifts the respective scaled element based on the integer exponent 804B, drops one or more fractional bits to get a respective M-bit integer, adds the zero point 806 to the respective M-bit integer to obtain a respective offset integer, and saturates the respective offset integer to a quantized P-bit element 908 to be stored into the output vector register 262.

Further, in some implementations, referring to FIG. 9, the integer exponent 804B includes a first exponent shift value 804C and a second exponent shift value 804D. During quantization, the electronic device 104 loads the first exponent shift value 804C, the second exponent shift value 804D, and the zero point 806 in a scalar register 264, and selects one of the first and second exponent shift values 804C and 804D based on a sign of the respective M-bit element 902. In accordance with a determination that the selected one of the first and second exponent shift values 804C and 804D is positive, the electronic device 104 applies a rounded right shift to the scaled element 812A of the respective M-bit element 902 based on selected one of the first and second exponent shift values 804C and 804D. In accordance with a determination that the selected one of the first and second exponent shift values 804C and 804D is negative, the electronic device 104 applies a saturating left shift to the scaled element 812A of the respective M-bit element 902 based on selected one of the first and second exponent shift values 804C and 804D.

In some implementations, the one or more input vector registers 260 are configured to store a first number of M-bit elements 902. The output vector register 262 is configured to store a second number of N-bit elements, and the second number is less than the first number. The output vector register 262 is partially or entirely filled by the set of P-bit elements 908. In some embodiments, a first ratio of the first and second numbers is equal to a second ratio of M and P. The first and second ratios are equal to a third number. Every third number of quantized elements of the input feature vector 802 is packed into a respective element of the output vector register 262. For example, the first number and the second number are equal to 64 and 16, respectively, and M and N are both equal to 32.

In an example, M is 32, and P is 8. The one or more input vector registers 260 include a pair of 32 register elements each having 32 bits. The output vector register includes 16 register elements each having 32 bits. In response to the single instruction, the output vector register is entirely filled. Every four elements of the set of M-bit elements 902 are quantized to four P-bit elements 908, and the four P-bit elements 908 are packed into a single register element of 32 bits. Conversely, in another example, M is 32, and P is 8. The one or more input vector registers 260 include a pair of 32 register elements each having 32 bits. The output vector register includes 32 register elements each having 32 bits. In response to the single instruction having one of two predefined flavors, a corresponding half of the output vector register is filled.

In some implementations, the electronic device 104 uses (1128) single instruction, multiple data (SIMD) to quantize the set of M-bit elements 902 from M bits to P bits of the respective element of the set of P-bit elements 908 in parallel.

In some implementations, the electronic device 104 is a mobile device and is configured to process a neural network 300 having an output layer 306. The output layer 306 is configured to generate an input feature vector 802 including the set of M-bit elements 902. An output feature vector 808 includes the set of P-bits, and is quantized from the input feature vector 802 and outputted by the neural network 300.

In some implementations, the electronic device 104 is a mobile device and is configured to process a neural network 300. The neural network includes a plurality of layers having at least a first layer 702 and a second layer 704, the second layer 704 is coupled to and immediately following the first layer 702. The first layer 702 is configured to generate an input feature vector 802 including the set of M-bit elements 902. An output feature vector 808 includes the set of P-bit elements 908. The second layer 704 is configured to receive and process the output feature vector 808 after the output feature vector 808 is quantized from the input feature vector 802.

Further, in some implementations, wherein the second layer 704 includes a plurality of weights and biases, and each of the plurality of weights, biases, and elements of the output feature vector 808 includes a P-bit fixed-point number. The electronic device 104 dequantizes each of the plurality of weights, biases, and elements of the output feature vector 808, applies the second layer 704 on the output feature vector 808 using the dequantized weights, dequantized biases, and dequantized elements of the output feature vector 808 to generate a second input vector, and in response to a second single instruction, quantizes a subset of the second input vector.

It should be understood that the particular order in which the operations in FIG. 11 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to FIGS. 1-10 and 12 are also applicable in the method 1100 in an exchangeable manner. For brevity, these details are not repeated here.

Figure 12:
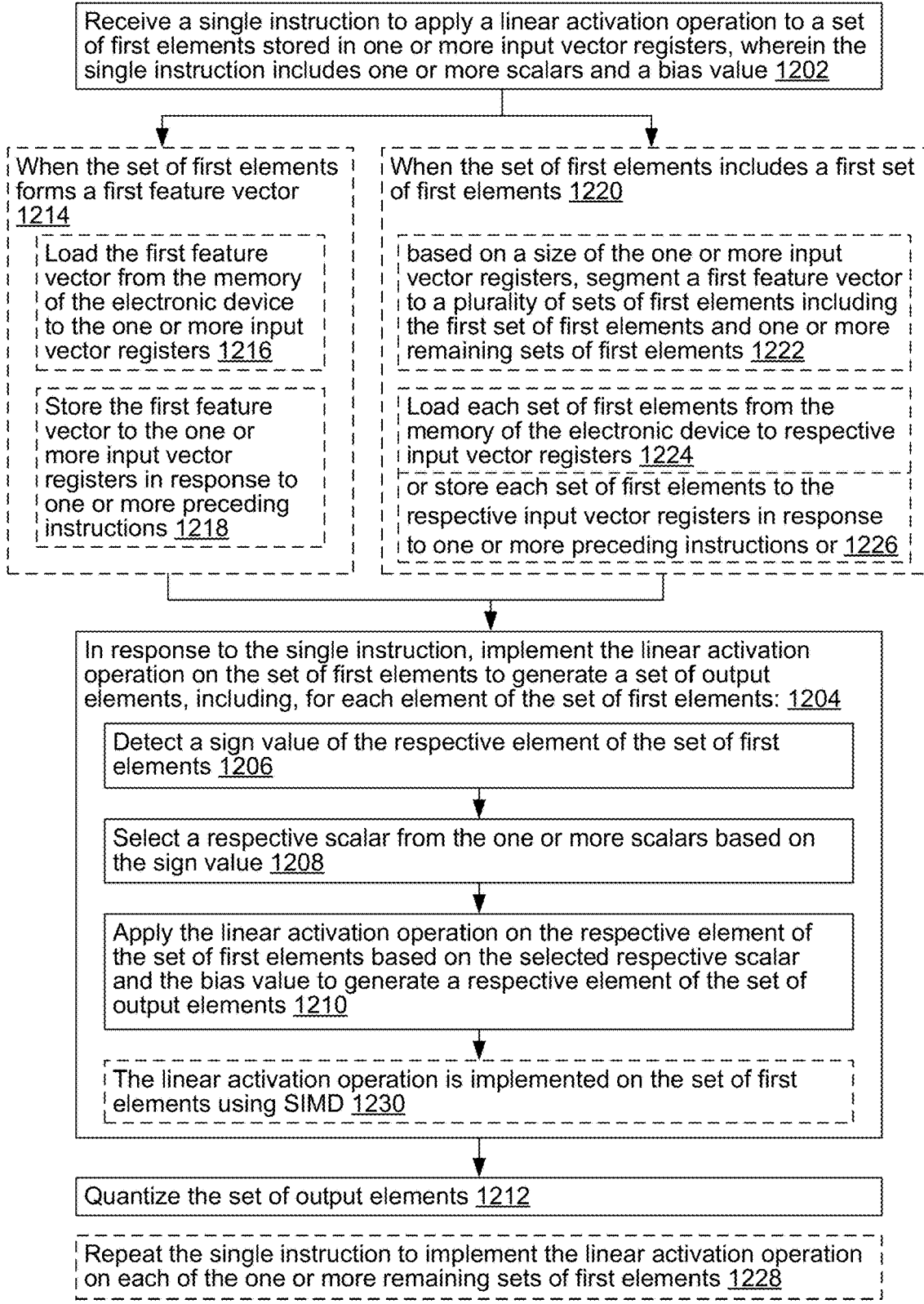
FIG. 12 is a flow diagram of a method for applying a linear activation function on a neural network layer, in accordance with some implementations.

FIG. 12 is a flow diagram of a method 1200 for applying a linear activation function on a neural network layer, in accordance with some implementations. For convenience, each of the method 1200 is described as being implemented by a processor of an electronic device 104. Each of the method 1200 is, optionally, governed by instructions that are stored in a non-transitory computer readable storage medium and that are executed by one or more processors (e.g., a vector processor) of the electronic device 104. Each of the operations shown in FIG. 1200 may correspond to instructions stored in a computer memory or non-transitory computer readable storage medium (e.g., memory 206 in FIG. 2). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1200 may be combined and/or the order of some operations may be changed.

The electronic device 104 receives (1202) a single instruction to apply a linear activation operation to a set of first elements 512 stored in one or more input vector registers 260. The single instruction includes one or more scalars 518 and a bias value 522. In response to the single instruction, the electronic device 104 implements (1204) the linear activation operation on the set of first elements 512 to generate a set of output elements 514. For each element of the set of first elements 512, the electronic device 104 detects (1206) a sign value 516 of the respective element of the set of first elements 512, selects (1208) a respective scalar 518 from the one or more scalars 518 based on the sign value 516, and applies (1210) the linear activation operation on the respective element of the set of first elements 512 based on the selected respective scalar 518 and the bias value 522 to generate a respective element of the set of output elements 514. The electronic device 104 quantizes (1212) the set of output elements 514.

In some implementations, the set of first elements 512 form (1214) a first feature vector 504. The electronic device 104 loads (1216) the first feature vector 504 from the memory of the electronic device to the one or more input vector registers 260 or stores (1218) the first feature vector 504 to the one or more input vector registers 260 in response to one or more preceding instructions. In response to the single instruction, the electronic device 104 obtains the set of first elements 512 from the one or more input vector registers 260. Conversely, in some implementations, the set of first elements 512 includes (1220) a first set of first elements 512A. Based on a size of the one or more input vector registers 260, the electronic device 104 segments (1222) a first feature vector 504 to a plurality of sets of first elements 512 including the first set of first elements 512A and one or more remaining sets of first elements 512R. The electronic device 104 loads (1224) each set of first elements 512 from the memory of the electronic device to respective input vector registers 260 or stores (1226) each set of first elements 512 to the respective input vector registers 260 in response to one or more preceding instructions. The electronic device 104 repeats (1228) the single instruction to implement the linear activation operation on each of the one or more remaining sets of first elements 512R.

Further, in some implementations, the electronic device further includes an output vector register 262, and the set of output elements 514 include a first set of output elements 514A. The electronic device 104 packs the first set of output elements 514A in the output vector register 262 after applying the linear activation operation. Additionally, in some implementations, the first set of output elements 514A are packed in a first portion the output vector register 262, and repeating the single instruction includes packing at least one remaining set of output elements 514R in a second portion of the output vector register 262. The second portion is distinct from the first portion.

In some implementations, the electronic device 104 obtains an input feature vector 530 of a layer of a neural network 300 by multiplying the input feature vector 530 with a weight matrix W to obtain an intermediate feature vector and adding a bias vector b to the intermediate feature vector to generate a first feature vector 504 including the set of first elements 512. Further, in some implementations, the electronic device 104 obtains the weight matrix W and the bias vector b. Each element of the input feature vector 530, weight matrix, and bias vector includes a fixed-point P-bit number. Prior to multiplying and adding, the electronic device 104 dequantizes each element of the input feature vector 530, weight matrix, and bias vector to a fixed-point M-bit number. M is greater than P. In an example, M and P are equal to 32 and 8, respectively. Further, in some implementations, the electronic device 104 includes a mobile device, and the weight matrix and bias vector have quantized P-bit elements and are stored in the memory 258 in association with the layer of the neural network 300.

In some implementations, the linear activation operation is configured to enable a linear activation unit 400 for a layer of filters of a neural network, and the one or more scalars 518 include a first scalar and a second scalar. The electronic device 104 selects the respective scalar based on the sign value 516 by selecting the first scalar in accordance with a determination that the sign value 516 corresponds to a positive sign and selecting the second scalar in accordance with a determination that the sign value 516 corresponds to a negative sign.

In some implementations, the linear activation operation is configured to enable a rectified linear unit (ReLU) 410 for a layer of filters of a neural network, and the one or more scalars include 1 and 0. The electronic device 104 selects the respective scalar based on the sign value 516 by selecting the respective scalar of 1 in accordance with a determination that the sign value 516 corresponds to a positive sign and selecting the respective scalar of 0 in accordance with a determination that the sign value 516 corresponds to a negative sign.

In some implementations, the linear activation operation is configured to enable a leaky ReLU 420 for a layer of filters of a neural network, and the one or more scalars includes 1 and a predefined leak parameter. The electronic device 104 selects the respective scalar based on the sign value 516 by selecting the respective scalar of 1 in accordance with a determination that the sign value 516 corresponds to a positive sign and selecting the respective scalar of the predefined leak parameter in accordance with a determination that the sign value 516 corresponds to a negative sign. The predefined leak parameter is smaller than 1.

In some implementations, the linear activation operation is configured to enable a parametric ReLU 430 for a layer of filters of a neural network, and the one or more scalars includes 1 and a predefined filter-based scalar. The electronic device 104 selects the respective scalar based on the sign value 516 by selecting the respective scalar of 1 in accordance with a determination that the sign value 516 corresponds to a positive sign and selecting the predefined filter-based scalar in accordance with a determination that the sign value 516 corresponds to a negative sign. The predefined filter-based scalar is trained with weights and biases of the neural network.

In some implementations, the electronic device further includes an output vector register 262 and a scalar register. The one or more input vector registers 260 are configured to store the set of first elements 512 having a first number of M-bit elements in total. The output vector register 262 is configured to store the set of output elements 514 having a second number of M-bit elements, the second number being equal to the first number. The scalar register has a single M-bit element, and is configured to store two N-bit scalars from which the respective scalar is selected, M being equal to 2N.

In some implementations, the electronic device 104 applies the linear activation operation on the respective element of the set of first elements 512 by multiplying the respective element with the respective scalar to generate a scaled respective element and adding the bias value 522 to the scaled respective element to generate a biased respective element. Further, in some implementations, the respective element of the set of first elements 512 has 32 bits, and the scaled respective element has 64 bits. The electronic device 104 adds the bias value 522 by right shifting the biased respective element by 15 bits to a shifted respective element and saturating the shifted respective element to 32 bits to provide the respective element of the set of output elements 514.

In some implementations, the linear activation operation is implemented (1230) on the set of first elements 512 using single instruction, multiple data (SIMD).

It should be understood that the particular order in which the operations in FIG. 12 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to FIGS. 1-11 and are also applicable in the method 1200 in an exchangeable manner. For brevity, these details are not repeated here.

In an example, the single instructions for quantization and the single instruction for activation are applied in a modem device to implement neural networks. Communication between the modem device and IoT devices 104F are made efficient such that battery-powered IoT devices 104F can operate for an extended duration of time (e.g., nearly 10 years or longer) in the field and keep low-power, wide-area connectivity in a small form factor.

Implementation examples are described in at least the following numbered clauses:

Clause 1. A method, comprising, at an electronic device having one or more processors and memory storing one or more programs, the one or more processors including a plurality of vector registers, the method comprising: receiving a single instruction to apply a neural network operation to a set of M-bit elements stored in one or more input vector registers; and in response to the single instruction, implementing the neural network operation on the set of M-bit elements to generate a set of P-bit elements, wherein P is smaller than M, including: obtaining the set of M-bit elements from the one or more input vector registers; quantizing each of the set of M-bit elements from M bits to P bits of a respective element of the set of P-bit elements; and packing the set of P-bit elements into an output vector register. M and P are distinct positive integers.

Clause 2. The method of clause 1, wherein the set of M-bit elements form an input feature vector, the method further comprising: loading the input feature vector from the memory of the electronic device to the one or more input vector registers; or storing the input feature vector to the one or more input vector registers in response to one or more preceding instructions.

Clause 3. The method of clause 1, the set of M-bit elements including a first set of M-bit elements, and the set of P-bit elements including a first set of P-bit elements, the method further comprising: based on a size of the one or more input vector registers, segmenting an input feature vector to a plurality of sets of M-bit elements including the first set of M-bit elements and one or more remaining sets of M-bit elements; loading each set of M-bit elements from the memory of the electronic device to respective input vector registers or storing each set of M-bit elements to the respective input vector registers in response to one or more preceding instructions; and repeating the single instruction to implement the neural network operation on each of the one or more remaining sets of M-bit elements to generate a respective remaining set of P-bit elements.

Clause 4. The method of clause 3, repeating the single instruction to implement the neural network operation on each of the one or more remaining sets of M-bit elements further comprising, in response to each single remaining instruction: obtaining a respective remaining set of M-bit elements of the input feature vector from the respective input vector registers; quantizing each of the respective remaining set of M-bit elements from M-bits to P bits of a respective element of the respective remaining set of P-bit elements; and packing the respective remaining set of P-bit elements into a respective output vector register.

Clause 5. The method of clause 4, wherein: the single instruction associated with the set of M-bit elements corresponds to a first instruction flavor, and at least one single remaining instruction corresponds to a second instruction flavor; the respective remaining set of P-bit elements are generated in response to the at least one single remaining instruction; and the first set of P-bit elements are packed in a first half of the output vector register, and the respective remaining set of P-bit elements are packed in a second half of the output vector register.

Clause 6 The method of any of the preceding clauses, wherein the single instruction includes a quantization factor and a zero point, and the neural network operation is a quantization operation including at least a multiplication with the quantization factor and an addition with the zero point, the addition following the multiplication.

Clause 7. The method of clause 6, wherein quantizing each of the set of M-bit elements further comprises, sequentially: converting the quantization factor to a mantissa and an integer exponent; and for each of the set of M-bit elements, multiplying the respective M-bit element with the mantissa to obtain a respective scaled element; shifting the respective scaled element based on the integer exponent; dropping one or more fractional bits to get a respective M-bit integer; adding the zero point to the respective M-bit integer to obtain a respective offset integer; and saturating the respective offset integer to a quantized P-bit element to be stored into the output vector register.

Clause 8. The method of clause 7, wherein the integer exponent includes a first exponent shift value and a second exponent shift value, quantizing each of the set of M-bit elements further comprising: loading the first exponent shift value, the second exponent shift value, and the zero point in a scalar register; wherein shifting the respective scaled element based on the integer exponent further includes, for each of the set of M-bit elements: selecting one of the first and second exponent shift values based on a sign of the respective M-bit element; in accordance with a determination that the selected one of the first and second exponent shift values is positive, applying a rounded right shift to the respective scaled element based on selected one of the first and second exponent shift values; and in accordance with a determination that the selected one of the first and second exponent shift values is negative, applying a saturating left shift to the respective scaled element based on selected one of the first and second exponent shift values.

Clause 9. The method of any of the preceding clauses, wherein: the one or more input vector registers are configured to store a first number of M-bit elements; the output vector register is configured to store a second number of N-bit elements, the second number less than the first number; and the output vector register is partially or entirely filled by the set of P-bit elements.

Clause 10. The method of clause 9, wherein: M is 32, and P is 8; the one or more input vector registers include a pair of 32 register elements each having 32 bits; the output vector register includes 16 register elements each having 32 bits; and in response to the single instruction, the output vector register is entirely filled, every four elements of the set of M-bit elements being quantized to four P-bit elements, the four P-bit elements be packed into a single register element of 32 bits.

Clause 11. The method of clause 9, wherein: M is 32, and P is 8; the one or more input vector registers include a pair of 32 register elements each having 32 bits; the output vector register includes 32 register elements each having 32 bits; and in response to the single instruction having one of two predefined flavors, a corresponding half of the output vector register is filled.

Clause 12. The method of any of the preceding clauses, wherein quantizing each of the set of M-bit elements further comprises: using single instruction, multiple data (SIMD) to quantize the set of M-bit elements from M bits to P bits of the respective element of the set of P-bit elements in parallel.

Clause 13. The method of any of the preceding clauses, wherein: the electronic device is a mobile device and is configured to process a neural network having an output layer; the output layer is configured to generate an input feature vector including the set of M-bit elements; and an output feature vector includes the set of P-bits, and is quantized from the input feature vector and outputted by the neural network.

Clause 14. The method of any of clauses 1-12, wherein: the electronic device is a mobile device and is configured to process a neural network; the neural network includes a plurality of layers having at least a first layer and a second layer, the second layer coupled to and immediately following the first layer; the first layer is configured to generate an input feature vector including the set of M-bit elements; an output feature vector includes the set of P-bit elements; and the second layer is configured to receive and process the output feature vector after the output feature vector is quantized from the input feature vector.

Clause 15. The method of clause 14, wherein the second layer includes a plurality of weights and biases, and each of the plurality of weights, biases, and elements of the output feature vector includes a P-bit fixed-point number, the method further comprising: dequantizing each of the plurality of weights, biases, and elements of the output feature vector; applying the second layer on the output feature vector using the dequantized weights, dequantized biases, and dequantized elements of the output feature vector to generate a second input vector; and in response to a second single instruction, quantizing a subset of the second input vector.

Clause 16. An electronic device, comprising one or more processors and memory storing one or more programs, the one or more processors including at least one or more input vector registers, wherein the electronic device is configured to implement the method in any of clauses 1-15.

Clause 17. A non-transitory computer readable storage medium, storing one or more programs, the one or more programs including instructions that when executed by the one or more processors including at least one or more input vector registers, cause the one or more processors to perform the method in any of clauses 1-15.

Clause 18. An apparatus, comprising means for implementing the method in any of clauses 1-15. The apparatus has one or more processors and memory storing one or more programs, and the one or more processors include a plurality of vector registers.

The above description has been provided with reference to specific implementations. However, the illustrative discussions above are not intended to be exhaustive or to be limiting to the precise forms disclosed. Many modifications and variations are possible in view of the above teachings. The implementations were chosen and described in order to best explain the principles disclosed and their practical applications, to thereby enable others to best utilize the disclosure and various implementations with various modifications as are suited to the particular use contemplated.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method implemented at an electronic device having one or more processors and memory storing one or more programs, the one or more processors including a plurality of vector registers, the method comprising:
   receiving a single instruction to apply a neural network operation to a set of M-bit elements stored in one or more input vector registers, where M is a positive integer; and
   in response to the single instruction, implementing the neural network operation on the set of M-bit elements to generate a set of P-bit elements, wherein P is smaller than M, including:
      obtaining the set of M-bit elements from the one or more input vector registers;
      quantizing each M-bit element of the set of M-bit elements from M bits to P bits of a respective element of the set of P-bit elements, where P is a positive integer; and
      packing the set of P-bit elements into an output vector register;
   wherein the single instruction includes a quantization factor and a zero point, and the neural network operation is a quantization operation including at least a multiplication with the quantization factor and an addition with the zero point, the addition following the multiplication; and
   wherein quantizing each M-bit element of the set of M-bit elements comprises, sequentially:
      converting the quantization factor to a mantissa and an integer exponent; and
      for each M-bit element of the set of M-bit elements:
         multiplying the respective M-bit element with the mantissa to obtain a respective scaled element;
         shifting the respective scaled element based on the integer exponent;
         dropping one or more fractional bits to get a respective M-bit integer; and
         adding the zero point to the respective M-bit integer to obtain a respective offset integer.

2. The method of claim 1, wherein the set of M-bit elements form an input feature vector, the method further comprising:
   loading the input feature vector from the memory of the electronic device to the one or more input vector registers; or storing the input feature vector to the one or more input vector registers in response to one or more preceding instructions.

3. The method of claim 1, further comprising:
based on a size of the one or more input vector registers, segmenting an input feature vector repeating the single instruction to implement the neural network operation.

4. The method of claim 1, wherein:
the one or more input vector registers are configured to store a first number of M-bit elements;
the output vector register is configured to store a second number of M-bit elements, the second number less than the first number; and
the output vector register is partially or entirely filled by the set of P-bit elements.

5. The method of claim 4, wherein:
M is 32, and P is 8;
each of the one or more input vector registers includes: a pair of 32 register elements;
the output vector register includes 16 register elements each having 32 bits; and
in response to the single instruction, the output vector register is entirely filled, every four elements of the set of M-bit elements being quantized to four P-bit elements, the four P-bit elements being packed into a single register element of 32 bits.

6. The method of claim 1, wherein quantizing each M-bit element of the set of M-bit elements comprises:
using single instruction, multiple data (SIMD) to quantize each M-bit element of the set of M-bit elements from M bits to P bits of the respective element of the set of P-bit elements in parallel.

7. The method of claim 1, wherein:
the electronic device is a mobile device and is configured to process a neural network having an output layer;
the output layer is configured to generate an input feature vector including the set of M-bit elements; and
an output feature vector includes the set of P-bit elements, and is quantized from the input feature vector and outputted by the neural network.

8. The method of claim 1, wherein:
the electronic device is a mobile device and is configured to process a neural network;
the neural network includes a plurality of layers having at least a first layer and a second layer, the second layer coupled to and immediately following the first layer;
the first layer is configured to generate an input feature vector including the set of M-bit elements;
an output feature vector includes the set of P-bit elements; and
the second layer is configured to receive and process the output feature vector after the output feature vector is quantized from the input feature vector.

9. The method of claim 8, wherein the second layer includes a plurality of weights and a plurality of biases, and each of the plurality of weights, each of the plurality of biases, and elements of the output feature vector includes a P-bit fixed-point number, the method further comprising:
dequantizing each of the plurality of weights, each of the plurality of biases, and elements of the output feature vector;
applying the second layer on the output feature vector using the dequantized weights, dequantized biases, and dequantized elements of the output feature vector to generate a second input vector; and
in response to a second single instruction, quantizing a subset of the second input vector.

10. An apparatus having one or more processors and memory storing one or more programs, the one or more processors including a plurality of vector registers, the apparatus comprising:
means for receiving a single instruction to apply a neural network operation to a set of M-bit elements stored in one or more input vector registers; and
means for in response to the single instruction, implementing the neural network operation on the set of M-bit elements to generate a set of P-bit elements, wherein P is smaller than M, M and P being distinct positive integers, including:
means for obtaining the set of M-bit elements from the one or more input vector registers;
means for quantizing each M-bit element of the set of M-bit elements from M bits to P bits of a respective element of the set of P-bit elements; and
means for packing the set of P-bit elements into an output vector register.

11. The apparatus of claim 10, wherein the set of M-bit elements form an input feature vector, and at least one processor of the one or more processors is configured to load the input feature vector from the memory to the one or more input vector registers.

12. The apparatus of claim 10, wherein the set of M-bit elements form an input feature vector, and at least one processor of the one or more processors is configured to store the input feature vector to the one or more input vector registers in response to one or more preceding instructions.

* * * * *